United States Patent [19]
Yayla et al.

[11] Patent Number: 5,343,555
[45] Date of Patent: Aug. 30, 1994

[54] ARTIFICIAL NEURON WITH SWITCHED-CAPACITOR SYNAPSES USING ANALOG STORAGE OF SYNAPTIC WEIGHTS

[75] Inventors: Gökçe Yayla, La Jolla; Ashok V. Krishnamoorthy, San Diego; Sadik C. Esener, Solana Beach, all of Calif.

[73] Assignee: The Regents of the University of California, Alameda, Calif.

[21] Appl. No.: 909,563

[22] Filed: Jul. 6, 1992

[51] Int. Cl.[5] .................................... G06F 15/18
[52] U.S. Cl. .............................. 395/24; 395/27; 307/201
[58] Field of Search ................. 395/24, 27, 25; 307/201

[56] References Cited

U.S. PATENT DOCUMENTS

| | | | |
|---|---|---|---|
| 4,873,661 | 10/1989 | Tsividis | 395/24 |
| 4,903,226 | 2/1990 | Tsividis | 395/24 |
| 4,926,180 | 5/1990 | Anastassiou | 395/27 |
| 5,039,871 | 8/1991 | Engeler | 395/24 |
| 5,115,492 | 5/1992 | Engeler | 395/24 |
| 5,140,531 | 8/1992 | Engeler | 395/24 |
| 5,261,035 | 11/1992 | Alder | 395/24 |

Primary Examiner—Allen R. MacDonald
Attorney, Agent, or Firm—Fuess, Davidenas & Meadows

[57] ABSTRACT

A pseudo-analog electronic or optoelectronic neuron stores synaptic weights as analog quantities, preferably as charges upon capacitors or upon the gates of floating gate transistors. Multiplication of a stored synaptic weight times a binary pulse-width-modulated synapse input signal periodically produces electrical charge of a first polarity on a first synapse capacitor. Meanwhile a fixed charge of opposite polarity is periodically produced at the same frequency upon another, second, synapse capacitor. The charges on both synapse capacitors at many synapses are periodically accumulated, and integrated, at a single neuron soma in the form of pulse-amplitude-modulated charge-encoded signals. This accumulation, and integration, transpires continuously progressively by a switched-capacitor technique, and during the entire duration of the input signal to each synapse. The net final result, expressed in signed electrical charge, is converted back to a PWM binary signal for transmission to further neurons. A fully capacitive synapse typically occupies a compact area of $45\lambda \times 42\lambda$, consumes less than 2 $\mu$W dynamic power (at 1 MHz) and offers more than 90% of the full voltage scale for linear weight adaptation. It is therefore well suited to large scale parallel implementations of adaptive neural networks.

17 Claims, 12 Drawing Sheets

ARTIFICIAL NEURON WITH SWITCHED-CAPACITOR SYNAPSES USING ANALOG STORAGE OF SYNAPTIC WEIGHTS

This invention was made by support of the U.S. Government acting through the Defense Advanced Research Project Agency (DARPA) of the U.S. Department of Defense (DoD) under contract No. AFOSR-90-0018]. The U.S. Government has certain rights in this invention.

REFERENCE TO RELATED PATENT APPLICATIONS

The present patent application is related to U.S. patent application Ser. No. 07/846,277 filed on Mar. 2, 1992, for a DUAL-SCALE TOPOLOGY OPTOELECTRONIC MATRIX ALGEBRAIC PROCESSING SYSTEM to the selfsame Ashok V. Krishnamoorthy and Sadik C. Esener who are co-inventors of the present application, and also to Gary C. Marsden and Joseph E. Ford.

BACKGROUND OF THE INVENTION

1. Field of the Invention

The present invention is generally related to (i) artificial neural networks and neural circuits, electronic and/or optoelectronic in construction, that simulate neural pathways in the human brain, and also to (ii) processors and processor circuits, electronic and/or optoelectronic in construction, that perform numerous and varied mathematical functions simultaneously, and in parallel.

The present invention is particularly related to a circuit, which may be implemented in either electronics or optoelectronics, for an artificial neuron having both neuron synapses and a neuron soma.

The present invention is still more particularly related to optimizing the power and/or representational accuracy, while minimizing the silicon area, of the data representations occurring within an artificial neuron. One optimization, in particular, will be seen to result from representing, storing, integrating and multiplying synaptic weight as an analog electrical quantity within an artificial neuron which, nonetheless to its internal analog processes, presents a digital signal interface.

2. Description of the Related Prior Art to the Invention

2.1 General Function of an Artificial Neuron

Electronic and optoelectronic neural networks and circuits respectively simulate the neural pathways and the neurons of a human brain. Such circuits and networks are useful for performing certain functions, and calculations, that emulate human senses, intelligence, and capabilities—particularly learning. Neural networks and circuits that perform learning are called adaptive. In order to accomplish reasonable learning and recitation functions in a reasonable time, electronic and optoelectronic neural networks are typically implemented at large scales from large numbers of neural circuits functioning in parallel.

Large scale parallel implementations of adaptive neural networks and circuits desirably exhibit the highest possible area and power efficiencies, and computational speeds. Meanwhile, the data representations, or encodings, that are supported by such networks and circuits must provide adequate precision for the application in question.

An artificial neuron typically includes both (i) a number of synapses and (ii) a neuron soma. Each of the synapses stores an associated synaptic weight. Normally this weight can be, and is, loaded, and reloaded, into each synapse as the artificial neuron "learns" how to evaluate input stimuli during operation of a neural network of which it forms a part. During operation of the artificial neuron each of its several synapses first receives an input signal, and then multiplies this input signal times the stored synaptic weight.

The collective products of many synapses are added, or integrated, at the neuron soma of the artificial neuron.

In order that an adequate signal-to-noise ratio may be maintained during further, subsequent, processing of the summary result of the multiplications and integrations in further, subsequent, neurons, the final result is typically transformed by a non-linear function, such as a threshold detector or a sigmoid function. The transformed signal output is then normally transmitted as an input signal to the synapses of still further artificial neurons. The interconnected artificial neurons collectively function as an artificial neural network.

2.2 Data Representation(s), and Multiplication and Integration Processes, Within an Artificial Neuron Two important considerations in the design of the circuit of an artificial neuron are (1) the storage mechanism of the synaptic weights and (2) the technique(s) used to implement the synaptic multiplication and the integration of the multiplication products.

Analog synaptic data storage and multiplication techniques have recently gained much popularity over the digital alternatives because of their high area efficiency. Reference M. Holler, S. Tam, H. Castro, and R. Benson, *An electrically trainable artificial neural network (ETANN) with 10240 'float gate' synapses,* Proc. IJCNN, 1989, vol. II, pp. 191–196 (San Diego). Reference also B. W. Lee and B. J. Sheu, *HARDWARE ANNEALING IN ANALOG VLSI NEUROCOMPUTING,* Kluwer Academic, 1991. Reference also C. Schneider, H. Card, *CMOS implementation of analog Hebbian synaptic learning circuits,* Proc. IJCNN, 1991, vol. I, pp. 437–442 (Seattle). Reference also F. Kub, K. Moon, J. Modolo, *Analog programmable chips for implementing ANNs using capacitive weight storage,* Proc. IJCNN, 1991, vol. I, pp. 487–492 (Seattle). Reference also G. Cauwenberghs, C. Neugebauer, A. Yariv, *An adaptive CMOS matrix-vector multiplier for large scale analog hardware neural network applications,* Proc. IJCNN, 1991, vol. I, pp. 507–511 (Seattle). Reference also P. Hasler, L. Akers, *A continuous time synapse employing a refreshable multilevel memory,* Proc. IJCNN, 1991, vol. I, pp. 563–568 (Seattle). Reference finally R. Tawel, R. Benson, A. P. Thakoor, *A CMOS UV-programmable nonvolatile synaptic array,* Proc. IJCNN, 1991, vol. I, pp. 581–585 (Seattle).

Conductance-based analog techniques for storing synaptic weights permit high-speed four-quadrant multiplication. However, these techniques generally (i) consume DC power as a result of biasing or buffering, and (ii) exhibit low linear dynamic range characteristics due to inherent transistor non-linearities. For instance, some artificial synapse designs call for operation of circuit transistors in the saturated operation whereas other designs call for transistor operation in the triode region. Both methods narrow the window within which synaptic weights may be stored by the artificial synapse, undesirably limiting the permissible swing range of the presynaptic inputs. Typically less than fifty percent (50%) of the full scale of a transistor's gain is useful for weight adaptation or presynaptic input variations. The linearity of transistor operation in an artificial synapse can be improved, but at the expense of either area (reference B. W. Lee, supra) and/or power consumption (reference G. Cauwenberghs, supra).

One method to linearize the synaptic response with respect to the presynaptic inputs is to use a time-domain multiplication method. Reference A. F. Murray, D. D. Corso, *Pulse-Stream VLSI neural networks mixing analog and digital techniques,* IEEE Transactions on Neural Networks, vol. 2, No. 2, March, 1991. Reference also J. L. Meador, A. Wu, C. Cole, N. Nintunze, and P. Chintrakulchai, *Programmable impulse neural circuits,* IEEE Transactions on Neural Networks, vol. 2, No. 1, January, 1991.

2.3 Direct Lineage of the Present Invention

The developments discussed within this section do not necessarily constitute prior art to the present invention, but are pertinent background to understanding the context of the present invention.

The selfsame inventors of the present application have proposed a scheme for the data representation(s), and manipulation(s), within an artificial neuron, wherein the synapses modulate the amplitude of presynaptic input signals which are (i) digital in amplitude but (ii) analog in pulse-width. Reference A. V. Krishnamoorthy, G. Yayla, and S. C. Esener, *Design of a scalable optoelectronic neural system using free-space optical interconnects,* Proc. IJCNN, 1991, vol. I, pp. 527–534 (Seattle). Reference also related U.S. patent application Ser. No. 07/846,277 filed on Mar. 2, 1992, for a DUAL-SCALE TOPOLOGY OPTOELECTRONIC MATRIX ALGEBRAIC PROCESSING SYSTEM.

Such digital amplitude, analog-width, signals are particularly appealing for optical communication. For correct function, digital, typically binary, amplitude modulation of optically communicated signals requires only that such signals should be maintained at an adequate signal to noise level above an optical detection threshold. Because the optical signals may cross each other in free space without interference, and because they are substantially immune to noise and unlikely of being obscured, their reliable communication at such an adequate signal-to-noise ratio is straightforward. Reference U.S. patent application Ser. No. 07/846,277, supra. Meanwhile, since optically communicated signals (i) travel at the speed of light, and (ii) are typically produced and detected in optoelectronic circuits having immense speed, information may be very effectively and accurately encoded in the time domain by the encoding such signals in duration.

Unfortunately, it has, in the past, been troublesome to use such digital-amplitude, analog-width, signals—which are superb for communication between artificial neurons—within an artificial neuron itself. If temporally-encoded information within presynaptic input signals that are digital in amplitude but analog in pulse-width is neither to be (i) lost nor (ii) transformed to another type of encoding at the synapses of an artificial neuron, then a temporal integration of such signals will be required at the neuron soma of the artificial neuron. This temporal integration is required in order to obtain a 2-quadrant multiplication of the synaptic weights times the presynaptic input signals. The capacity of the neuron body in performing this integration must be large enough to deal with any such temporal variations in the presynaptic input signals as might result in non-linearities (before the intentional introduction of such non-linearities in the neuron soma).

One way that an amplitude-modulated synaptic input signal might be multiplied at an artificial synapse by a synaptic weight that is stored at the synapse would be to produce a varying current dependent upon the results of the multiplication. Alas, a proper integration of many synaptic output currents from many synapses becomes increasingly area intensive as the number of fan-in signals per neuron increases. One possible solution to this difficulty might be to use relatively small synaptic output currents. For a given Metal Oxide Semiconductor (MOS) fabrication technology, this would be possible either by (i) operating the MOS transistors in the sub-threshold regime or by (ii) increasing the length of the MOS transistors. The first alternative undesirably restricts the linear programming window of the synaptic weights to only a couple percent of the available supply range, whereas the second alternative undesirably increases the synapse area.

Alternatively, the benefits of (i) a small output current, (ii) a large linear dynamic range and (iii) negligible DC power consumption might be realized in combination by use of a capacitance-based technique for storage of synaptic weights. Among the existing programmable capacitive synapse designs, it is known to use a Multiplying Digital to Analog Converter (MDAC) configuration together with the digital storage of the weight. Reference Y. P. Tsividis and D. Anastassiou, *Switched-capacitor neural networks,* Electron. Lett., vol. 23, pp. 958–959, 1987. Reference also J. E. Hanson, J. K. Skelton, and D. J. Allstot, *A time multiplexed switched-capacitor circuit for neural network applications,* Proc. ISCAS, pp. 2177–2180, 1989. While this MDAC technique offers relatively high precision, the synapse area is still large due to the digital storage of the weight. Moreover, the digital weight must be (i) converted to a current, and then (ii) subjected to a current summation in the MDAC. This (i) conversion and (ii) summation is relatively inaccurate.

Accordingly, it would be exceedingly useful if, somehow, silicon area could be conserved by using an analog representation of data within an artificial neuron, and within an artificial neural network, nonetheless that the severe limitations of analog signals for the conservation of power, and the accuracy of communication and computation, between neurons could be overcome. If these limitations are to be so overcome by selectively transforming analog signals within the artificial neuron to and from digital signals—which digital signals are both power-conserving and precise—for communication between neurons, then such transformation(s) should be with a minimal area and/or time impact on both (i) the performance of the artificial neuron and (ii) the artificial neural network of which it forms a part.

The present invention will be seen to be directed to a circuit for an artificial neuron that is both silicon-area-conserving and power-conserving, while being highly accurate, for both (i) communications exterior to the neuron—which are via digital signals—and (ii) multiplications and integrations internal to the neuron—which are via analog signals. Such a circuit would be optimized for both its internal (analog), and its external (digital), data representations.

SUMMARY OF THE INVENTION

The present invention is based on the recognition that (i) internal data representations within an artificial neuron of an artificial neural network should, for purposes of conservation of silicon area, be as analog signals (typically analog electrical signals but potentially also analog radiation signals), whereas (ii) the same data representations should, for purposes of the conservation of power, and the accuracy of communication external to the artificial neuron and between the artificial neurons of the artificial neural network, be as digital signals (typically digital electrical signals but potentially also digital radiation signals).

An artificial neuron generally includes (i) a number of artificial synapses connected in electrical parallel to a (ii) an artificial neuron soma. In accordance with the present invention, the signal output of the artificial neuron from its neuron soma is digital, and is preferably a signal possessed of a (i) binary amplitude with information encoded in the (ii) time domain. The preferred time-domain-encoded binary output signal may be, for example, a pulse-frequency-modulated (PFM) signal, or a signal encoded in other common forms of time-domain digital (binary) encoding. The output signal is preferably a pulse-width-modulated (PWM) binary signal the time duration of which encodes the information carried by the signal. The artificial neuron's preferred binary PWM binary output signal may be either (i) electrical or (ii) optical. (An optical signal output is especially efficacious of (optical) communication in large scale optoelectronic networks such as that network taught within related U.S. patent application Ser. No. 07/846,277 for a DUAL-SCALE TOPOLOGY OPTOELECTRONIC MATRIX ALGEBRAIC PROCESSING SYSTEM.) The preferred PWM binary digital output signal of the neuron soma of one artificial neuron is typically received as an input signal at one or more artificial synapses of one or more subsequent artificial neurons that are arranged in, and as, a neural network.

Further in accordance with the present invention, and meanwhile, the signal produced at each of a number of artificial synapses of an artificial neuron in response to (i) receipt of an input signal, and (ii) multiplication of this input signal by a stored synaptic weight, is analog. Each synapse receives a digital input signal, normally the preferred PWM binary input signal, and produces therefrom an analog signal that represents the product of the input signal and a stored synaptic weight. The analog product signal is preferably encoded in the amplitude domain. This analog amplitude-domain-encoded signal may be encoded in voltage, or in current, or in resistance, but is preferably encoded in the charge amplitude domain. More particularly, the product signal produced by each synapse is preferably a pulse-amplitude-modulated (PAM) analog signal the electrical charge of which encodes the product information which is carried by the signal. The synapse's preferred analog PAM electrical-charge-encoded product signal output may be either (i) electrical or (ii) optical, but is preferably electrical.

Still further in accordance with the present invention, a synaptic weight stored at each of the artificial synapses of an artificial neuron is stored as an analog quantity, and preferably as the electrical charge upon a storage capacitor or the gate of a floating-gate transistor. This stored synaptic weight, or electrical charge, is periodically gated so as to produce a proportional electrical charge upon yet another, so-called first, capacitor during the duration of the input signal. The total amount of electrical charge produced upon the first capacitor is, accordingly, the product of the stored synaptic weight and the input signal.

The electrical charge upon the first capacitor, along with equivalent electrical charges arising at the first capacitors of other synapses, is periodically gated during the duration of the input signal to the neuron soma as the preferred electrical-charge-encoded PAM analog product signal. However, and still further in accordance with the present invention, the periodic gating of these electrical charges produced upon the first capacitors of the several synapses to the neuron soma is not the sole, nor the only, gating of an electrical charge. Rather, this periodic gating of the (variable) electrical charge upon the second capacitors is temporally switched, or multiplexed, or interspersed, with yet another periodic gating of a fixed amount of electrical charge having an opposite polarity that is produced upon yet another, second, capacitor at each synapse.

According to this operation, both a fixed amount of opposite-polarity electrical charge produced upon a one (second) capacitor, and variable amount of electrical charge produced upon another (first) capacitor, are separately periodically gated to the neuron soma during the duration of the input signal to that synapse. The summation and integration at the single neuron soma over the durations of the several input signals as are received at the several synapses of both positive and negative electrical charges received from each one of the several synapses permits the formation of a result. This result, as is represented by the net electrical charge collected from all the synapses at the neuron soma, may be either positive or negative. In other words, the product of each synapse is signed, and the collective result from the summation and integration of the signed products of all synapses possesses a sign. The entire operation of the neuron in accumulating, and in integrating, the electrical charge from two capacitors at each synapse is called "switched capacitor".

The electrical analog PAM signal outputs from a number of artificial synapses are communicated to the neuron soma along a number of parallel electrical paths, or lands. These parallel electrical paths (i) exhibit capacitance, and (ii) are organized in a tree, preferably an equal-length path "X-tree" or, preferably, an "H-tree". The signed product signals from all the synapses are accurately summed, and integrated, at the neuron soma—with an equal weight accorded to each such signal as a consequence of the signals' respective passages along the electrical paths that are of equal length—because of the efficient capture at the neuron soma over the time duration of the input signals of the all the signed electrical charge that is collectively contained within all the synaptic product signals.

It will be appreciated that, in operation of the circuit of an artificial neuron in accordance with the present invention, the signed synaptic products, being electrical charges, are accumulated over time, and during the respective durations of the respective input signals to the respective synapses, and neither abruptly at the end of, nor subsequent to, such input signals. This accumulation over time is the reason that the function of the neuron soma is spoken of as "integration" as well as "summation". This time-based progressive integration is accurate, and obviously delivers the final result almost immediately that the last input signal terminates.

Therefore, as a result of both (i) the internal signal representation (analog, PAM, electrical-charge-bearing) and (ii) the physical organization (analog storage of synaptic weights, H-tree structure) of an artificial neuron in accordance with the present invention, the neuron is very fast, and very accurate, in performance of its (classical, standard) neuron function. Nonetheless to being fast and accurate, the artificial neuron is highly conserving of power and silicon area. Each synapse typically occupies a compact area of $45\lambda \times 42\lambda$ (where $\lambda$ is one-half the minimum fabrication feature size, typically on the order of 0.5 micron), consumes less than 2 $\mu$W dynamic power (at 1 MHz) and offers more than 90% of the full voltage scale for linear weight adaptation. Networks of artificial neurons each consisting of several synapses (for example, sixteen such), one neuron soma, and, optionally, still other electrical structures called fan-in, or dendrite, units which are located in an K-tree between the several synapses and the neuron soma (for example, fourteen such dendrite units), may suitably perform either classical neural network functions, or still other functions such as vector-scaler or vector-vector multiplications.

The efficiency, effectiveness, and performance of artificial neurons in accordance with the present invention is useful in exclusively electronic neural networks. However, certain embodiments of the neurons readily support optical interconnection, and communication. One use of many neurons having a particular, optoelectronic, embodiment is in that large scale optoelectronic network which is taught within related U.S. patent application Ser. No. 07/846,277 for a DUAL-SCALE TOPOLOGY OPTOELECTRONIC MATRIX ALGEBRAIC PROCESSING SYSTEM. In such an architecture the artificial neurons in accordance with the present invention not only individually function quickly, efficiently, and accurately, but they support an optical communication of data to each other (i) at a high speed and (ii) in a manner that supports a considerable versatility in system function. Namely, a system constructed of one exemplary optoelectronic embodiment of artificial neurons in accordance with the present invention may, for example, perform vector inner and outer product, and matrix multiplications, at the considerable rate of $10^{12}$ bit operations per second using conventional, presently-available (circa 1992), semiconductor (electronic and optoelectronic) and optical technologies. Accordingly, artificial neurons in accordance with the present invention may be appreciated not only for their excellence in performance of the classical neuron function, but for their flexible, and comprehensive, adaptability to advanced neural network architectures.

These and still other aspects and attributes of the present invention will become increasingly clear upon reference to the following drawings and accompanying specification.

BRIEF DESCRIPTION OF THE DRAWINGS

FIG. 8b is a schematic diagram of a portion of an artificial neuron circuit in accordance with the present invention having (i) an electrical input and (ii) floating-gate storage of synaptic weight, which portion corresponds to that portion previously seen in FIG. 8a.

FIG. 8c is a schematic diagram of a portion of an artificial neuron circuit in accordance with the present invention having (i) a electrical input and (ii) DRAM-style storage of synaptic weight, which portion corresponds to that portion previously seen in FIG. 8a.

FIG. 8d is a schematic diagram of a portion of an artificial neuron circuit in accordance with the present invention having (i) an optical input and (ii) floating-gate storage of synaptic weight, which portion corresponds to that portion previously seen in FIG. 8a.

DESCRIPTION OF THE PREFERRED EMBODIMENT

Figure 1:
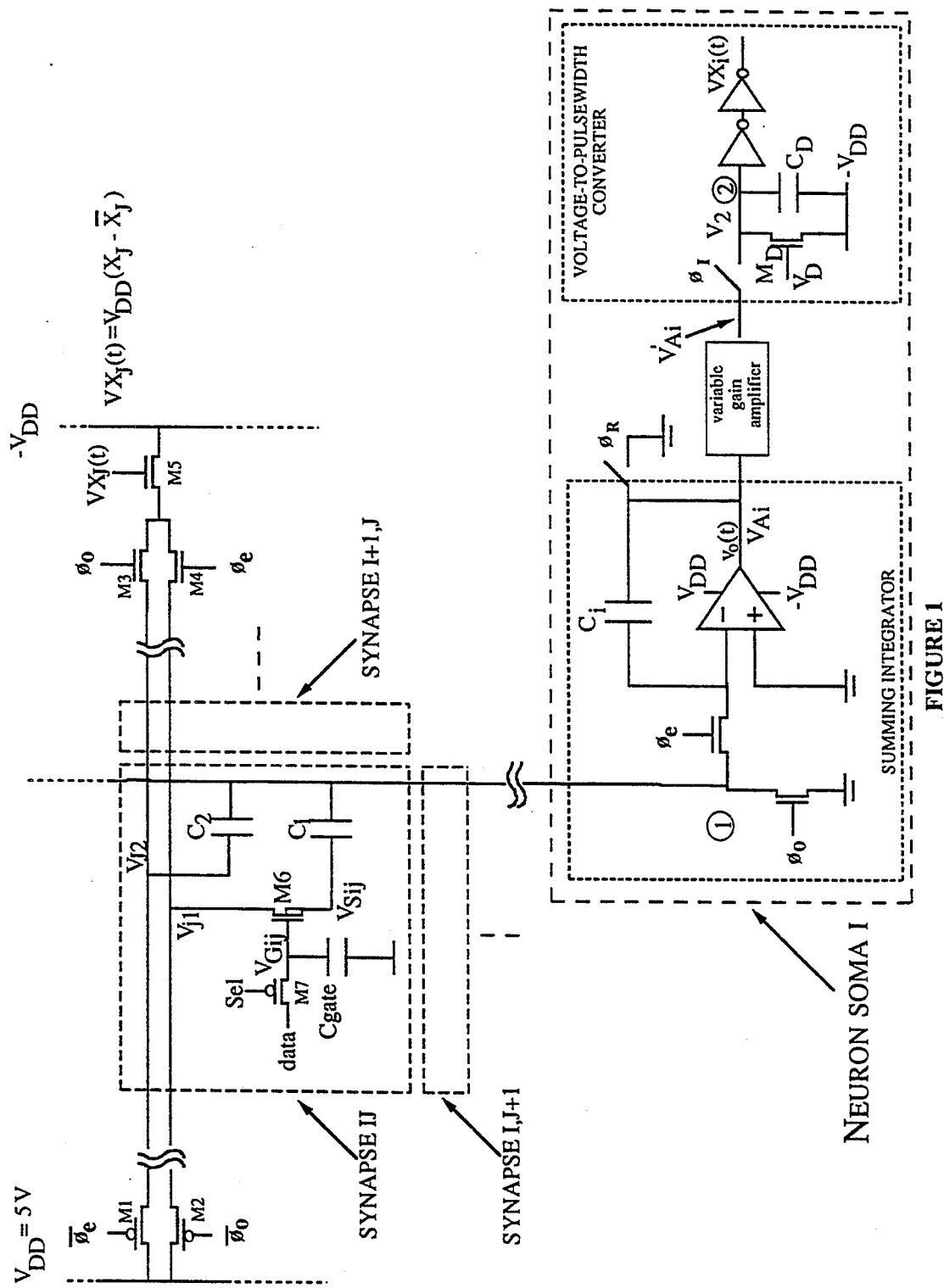
FIGS. 1 is an electrical schematic diagram of an exemplary first, electrical input with DRAM-style storage, embodiment of the new switched-capacitor analog-storage artificial neuron circuit in accordance with the present invention.

The present invention concerns a new circuit design for an artificial neuron. The circuit is pseudo-analog in operation: it receives digital input signals and it produces digital output signals but the internal operation of the circuit is, at least in part, analog.

Each of typically many synapses of the artificial neuron circuit stores an associated synaptic weight as an analog quantity, preferably as the charge upon a capacitor or a floating-gate transistor. Each synapse operates to charge, and to switch between, two further capacitors in order to produce an electrical charge on each such capacitor. The electrical charge produced on one capacitor is the product of (i) a pulse-width-modulated signal received at the synapse with (ii) the stored synaptic weight. The electrical charge produced on the other capacitor is fixed, and of opposite polarity to the charge upon the other capacitor. The reason that two capacitors are used is so as to permit a summation of the charge from both capacitors to be a signed product, and, in particular, so as to permit that the signed product should be of either positive or negative sign.

The produced electrical charge from a number of synapses is accumulated, and integrated, at a neuron soma. The technique by which the charge of a one of two polarities is developed at each synapse, and accumulated at the neuron soma, is called a "switched-capacitor" technique. The reasons why the artificial neuron in accordance with the present invention is so constructed, and so functions, are discussed in the following sections.

1. Data Encoding for and Within an Artificial Neural Network, and an Artificial Neuron A critical issue for the implementation of an artificial neural network an/or an artificial neuron is the method of data representation. The data representation should be chosen to (i) minimize both silicon area and the on-chip power dissipation, while (ii) providing the precision necessitated by the application in question.

Several different data encoding methods have been suggested for communication between (electronic) neuron modules. Pulse-amplitude modulation (PAM) has been suggested by J. J. Hopfield, *Neurons With Graded Response Have Collective Computational Properties Like Those of Two-State Neurons*, Proc. Natl. Acad. Sci. USA, 81, pp. 3088–3092, May, 1984. Pulse frequency modulation (PFM) has been suggested by A. F. Murray, *Pulse Arithmetic in VLSI Neural Networks*, IEEE Micro, pp. 64–74, December, 1989, and also by D. Del Corso, F. Gregoretti, C. Pellegrini, L. Reyneri, *An artificial neural network based on multiplexed pulse streams*, Proc. of Workshop on Microelectronics for Neural Networks Dortmund, June, 1990. Finally, pulse width modulation (PWM) has been suggested by D. Del Corso, supra, and also by O. N. Mian and N. E. Cotter, *Convergence Properties of a Pulsed Neural Network*, Proc. of IJCNN, San Diego, pp. 599–609, July, 1990.

Likewise, several different data encoding methods have been suggested for the synaptic data storage and multiplication operations transpiring within an artificial neuron. As discussed in the BACKGROUND OF THE INVENTION section of this application, analog techniques are currently more popular than digital techniques because of the high area efficiency of analog (i) storage and (ii) multiplication. Reference M. Holler, et al., supra. Reference also B. W. Lee and B. J. Sheu, supra. Reference also F. Kub, et al., supra. Reference also G. Cauwenberghs, et al., supra. Reference also P. Hasler and L. Akers, supra. Reference finally R. Tawel, et al., supra.

Alas, the preferred data encoding methods for neuron-to-neuron communication are (predominantly) digital whereas the preferred data encoding methods within the neurons are (predominantly) analog. Although neither the communication of data between, nor within, neurons need be optical, and can instead be exclusively electrical, the superior speed and flexibility of optical communication is useful for the interconnection of large numbers of artificial neurons in large, and powerful, neural networks and systems. Accordingly, (i) preferred digital data encoding methods for optical communication between neurons may usefully be considered in juxtaposition to (ii) preferred analog data encoding methods entirely within an optoelectronic neuron (performing its functions exclusively electronically) in order to determine that, if a solution effectively reconciling these competing requirements could somehow be found for the instance of an optoelectronic neural network, and for optoelectronic neurons, then such a solution might also serve for networks and neurons that are exclusively electronic (exclusively optical networks and neurons do not yet exist).

2. A Neuron-to-Synapse Channel that is Optical Is Well Served By a Pulse-Width-Modulated Encoding of Data For an optical neuron-to-synapse channel, a pulse-amplitude modulated (PAN) encoding scheme requires both (i) high contrast-ratio light modulators and (ii) optical interconnects with tightly controlled, uniform losses in order to provide accurate analog intensity information. While electrically addressed light modulators with high contrast-ratios are achievable, there is an inherent trade-off between the speed of operation and electro-optic efficiency. Reference T. Y. Hsu, U. Efron, W. Y. Wu, J. Schulman, I. D'Haenens, and Y. C. Chang, *Multiple Quantum well spatial light modulators for optical processing applications*, Optical Engineering 5

(27), May, 1988. Moreover, the voltage incompatibility of light modulators with VLSI circuitry imposes serious system constraints if PAN methods are used.

Binary encoding schemes such as pulse frequency modulation (PFM) and pulse amplitude modulation (PWM) demand the detection of only two light intensity levels. These schemes are accordingly more immune to parameter variations and system noise than is PAN. Hence, they are more suitable for fast light modulators with limited contrast ratios—such as flip-chip bonded .Si/PLZT spatial light modulators—where compatibility with VLSI dictates that low modulation voltages be used. See, for example, U.S. patent application Ser. No. 07/632,033 for a SYSTEM AND METHOD FOR PRODUCING ELECTRO-OPTIC COMPONENTS INTEGRATABLEWITH SILICON-ON-SAPPHIRE CIRCUITS filed Dec. 21, 1990, now U.S. Pat. No. 5,242,707 to inventors including the selfsame Sadik Esener who is a co-inventor of the present application, for the teaching of an exemplary Si/PLZT spatial light modulator.

Figure 8A:
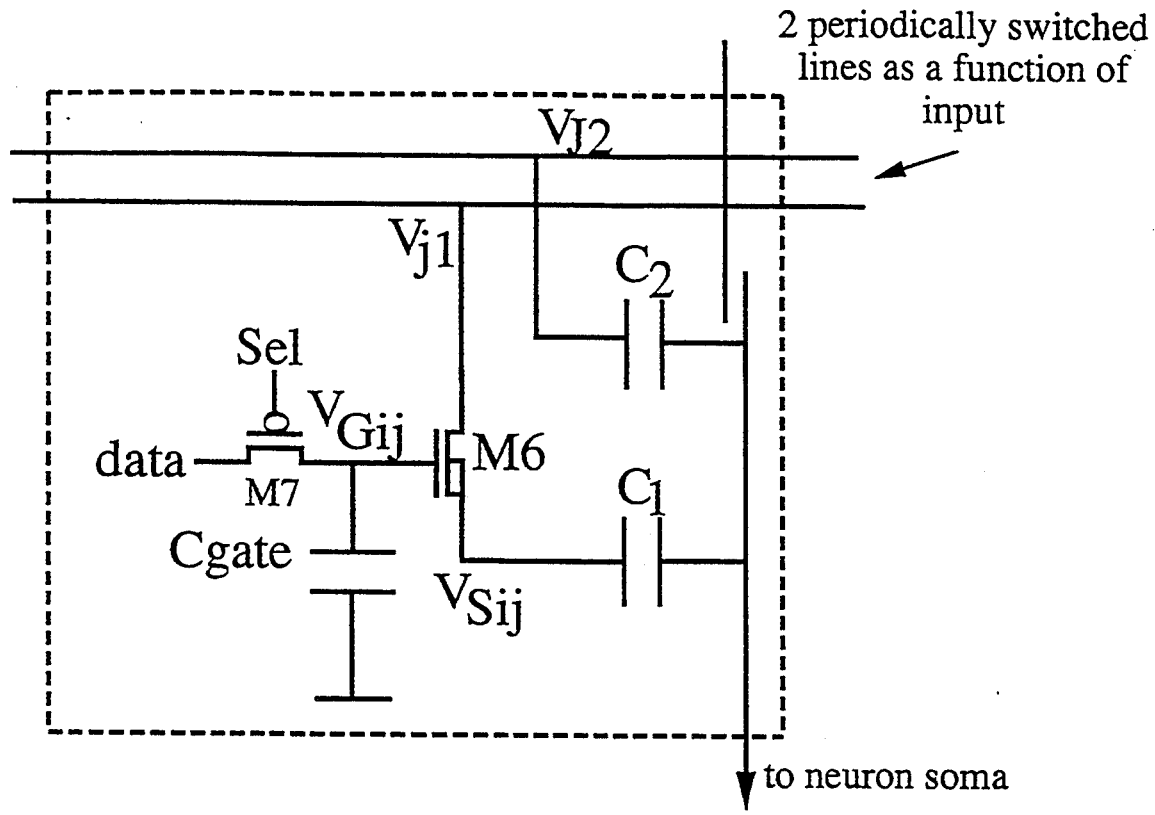
FIG. 8a is a schematic diagram of a portion of that same artificial neuron circuit in accordance with the present invention having (i) an electrical input and (ii) DRAM-style storage of synaptic weight as was previously seen in FIG. 1.
Figure 8B:
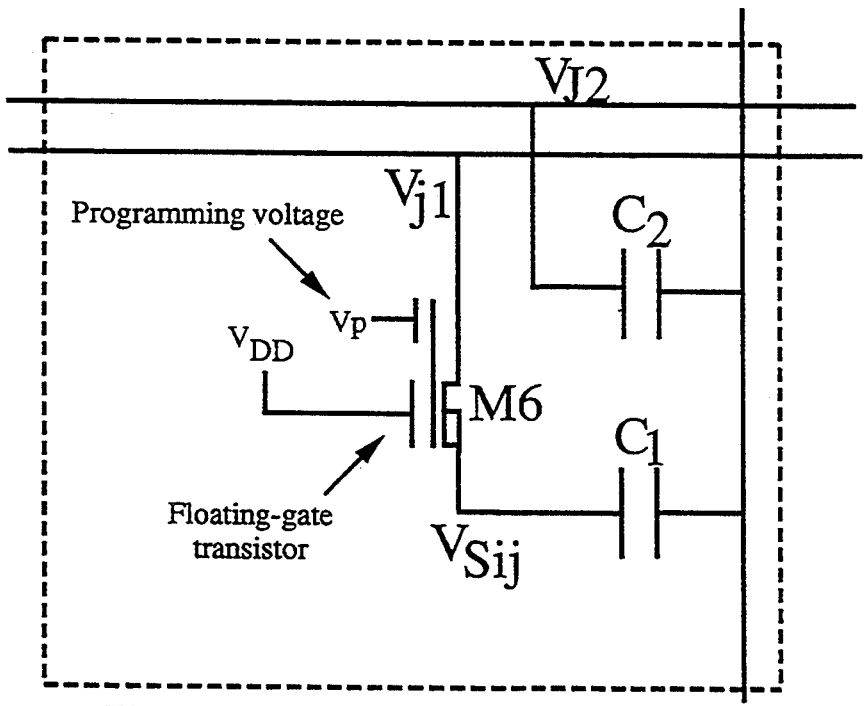
Figure 8C:
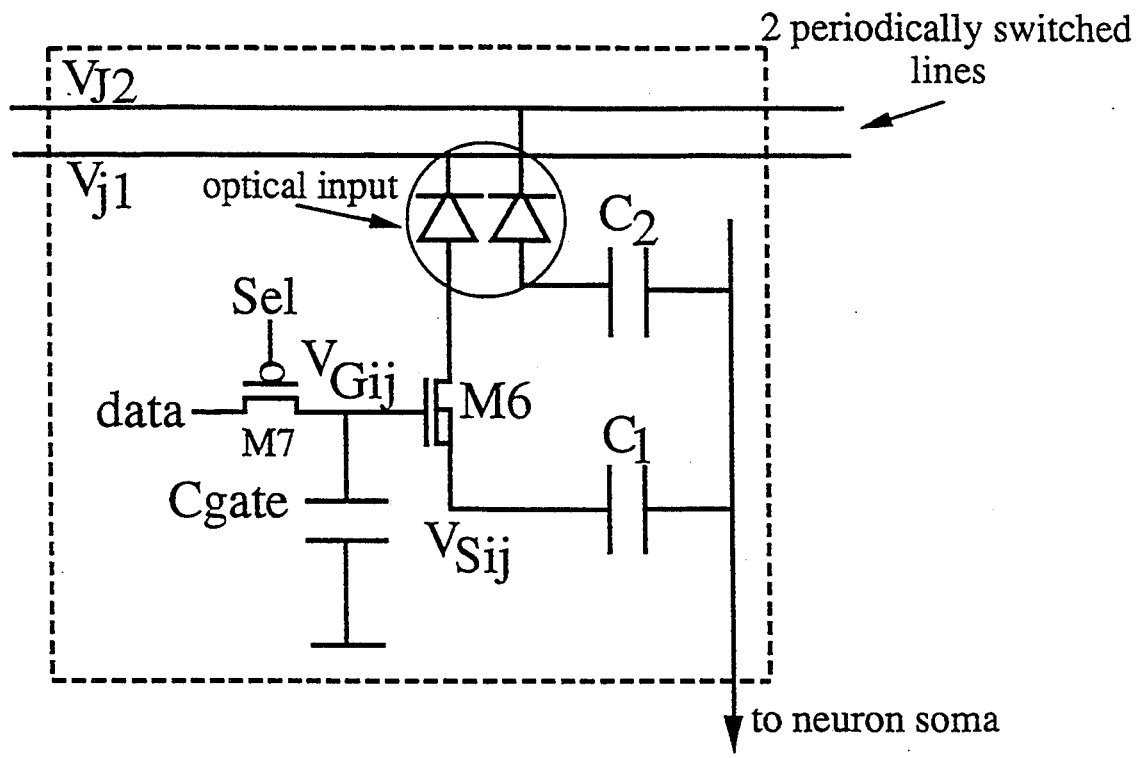

Another important consideration in the choice of encoding schemes is power consumption. FIG. 8a shows the equivalent circuit of a light modulator (LM). The light modulator consists of a circuit which drives the capacitance of the electro-optic material. FIG. 8b shows the equivalent circuit of a light detector (LD). An equivalent circuit of a light detector (LD) driving a resistive load is shown in FIG. 8c, and consists of a light-intensity-controlled current source (or resistance) driving a load.

PAM encoding methods require analog voltage states to be detected. This necessitates a linear resistive load at the detector sites, as shown in the equivalent circuit of FIG. 8c, and results in static power consumption at the synapse level due to the short circuit current $I_{sc}$. This DC short circuit current may be considerably high, since high-valued VLSI resistors are difficult to implement without incurring inefficiencies in area or precision (e.g., passive resistors), linearity (e.g., active resistors), or complexity (e.g., switched capacitor resistors). These problems can severely limit synaptic resolution and/or integration density.

Figure 8D:
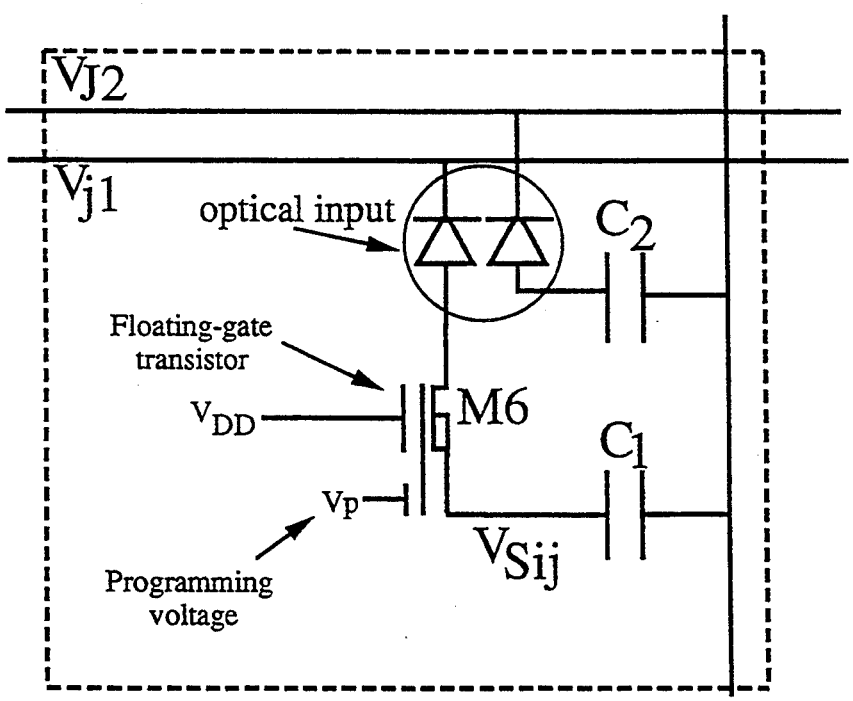

With PFM or PWM encoding methods, the detected voltage $VD_{DET}$ has binary values as stable states. In these cases, the driver circuitry may be designed as a simple CMOS buffer with negligible static power consumption. The detector circuit may be designed using a dynamic capacitance-based technique—thereby eliminating any static power dissipation. The electrical equivalent circuit of such a design is shown in FIG. 8d.

Among the binary encoding methods, PFM methods require high speed modulation and generally result in higher dynamic power consumption than PWM methods since the modulator and detector capacitances must be charged and discharged at higher frequencies.

For all these reasons, a PWM encoding method is probably best suited, and is at least well suited, for optical neuron-to-synapse communication.

3. A Synapse-to-Neuron Channel that is Electronic is Well Served By a Pulse-Amplitude-Modulated Encoding of Data For an electronic synapse-to-neuron soma channel within an optoelectronic neuron, a Pulse-Amplitude-Modulated (PAM) data encoding method has several advantages. Available VLSI devices and circuit techniques can provide sufficient precision so that PAM methods may be used with relatively high integration densities. In contrast, the time resolution available at the synapse level is low due to area considerations. Reference A. F. Murray, supra.

Another issue in choosing the data encoding method to be used within an optoelectronic neuron is the linear dynamic range limitation of the encoding method. If the synapses serve to modulate a received PWM neuron output signal in its original, temporal, dimension, then a resolution or dynamic range problem may occur. This problem is alleviated if the synapses modulate the neuron signal in a different dimension (as is the case in biological neurons).

This suggests that PAM data encoding for synapse-to-neuron soma communication within an optoelectronic neuron, in conjunction with PWM data encoding for communication between optoelectronic neurons, would be excellent. Such dual encoding methods could prospectively result in accurate, low area, low power, and compatible-technology optoelectronic neurons and neuron communications (see the next Section 4).

Both current (or charge packets) and voltage signals have been used in synapse to neuron communication. However, the summation and integration of current signals are easier than voltage signals: one electronic node is sufficient to sum the current signals and one capacitor is sufficient to integrate them. There is no pulse overlap problem as in the case of voltage summation. Reference A. F. Murray, D. Del Corso, and L. Tarasserko, *Pulse-stream VLSI neural networks mixing analog and digital techniques*, IEEE Transactions on Neural Networks 2, pp. 193–204, March, 1991.

Furthermore, the scheme using amplitude modulated current signals is inherently suited to the physics of the chip layout: the H-tree connecting the synapses of one neuron to its body has a capacitance which naturally integrates the synaptic currents. Hence, the integration capacitance of the neuron body can be implemented as an H-shaped capacitor automatically providing the necessary interconnection and reducing the area of the neuron body.

4. Optoelectronic Synapses and an Optoelectronic Neuron Soma

Two important considerations in synapse design are the storage mechanism and the devices/circuit techniques to be used for implementing synaptic multiplication. DRAM and nonvolatile EEPROM-style analog storage, compared to digital storage methods which demand large areas, have emerged as promising storage techniques with the potential for high synaptic storage resolution in a relatively small area. Reference M. Holler, et al., *An electrically trainable neural network (ETANN) With 10240 floating gate synapses*, Intl. Joint Conference on Neural Networks, 2, pp.191–196, June, 1989. Reference also B. W. Lee and B. J. Sheu, *HARDWARE/ANNEALING IN VLSI ANALOG NEUROCOMPUTING*, Kluwer Academic, 1991.

Several resistive or current source-sink type of synapses have been proposed for implementing synaptic multiplication. However, such conductance-based approaches using a MOSFET-based conductor, a multiplying D/A converter (MDAC), or an analog MOS multiplier have various limitations: low linear dynamic range resulting from natural transistor nonlinearities; low resolution due to parameter variations and noise; DC power consumption through voltage division, buffering or current mirroring; and large area requirements as a result of the unavoidable design of non-minimum geometry transistors. Capacitive synapses, on the other hand, have been suggested for good linearity, negligible DC power consumption, and high area efficiency and resolution with low process noise. Reference Y. P. Tsividis and D. Anastassiou, *Switched-capacitor neural networks*, Electron Lett. 23, pp. 958, 1987. Reference also A. Rodriguez-Vazquez, et al., *Nonlinear switched-capacitor neural networks for optimization problems*, IEEE Trans. on Circuits and Systems 37, No. 3, 1987. Reference finally U. Cilingiroglu, *A Purely Capacitive Synaptic Matrix for Fixed-Weight Neural Networks*, IEEE Trans. on Circuits and Systems, 38 (2) pp. 210, February, 1991.

5. Summary Description of the Pulse-Amplitude-Modulating Synapse of the Artificial Neuron of the Present Invention The circuit design of the present invention combines the synaptic multiplication principle described in the inventors' own paper (i.e., G. Yayla, A. V. Krishnamoorthy and S. C. Esener, *Switched-capacitor synapses using analog storage*, submitted June, 1992, to IEEE Trans. on Neural Networks (to be published)) with capacitive-load light detection. The circuit uses a switched-capacitor technique with either DRAM or EEPROM-style analog-storage to achieve a simple synapse circuit (the analysis presented here assumes EEPROM-style storage). Synaptic multiplication is obtained using a time-domain multiplication method.

Figure 2:
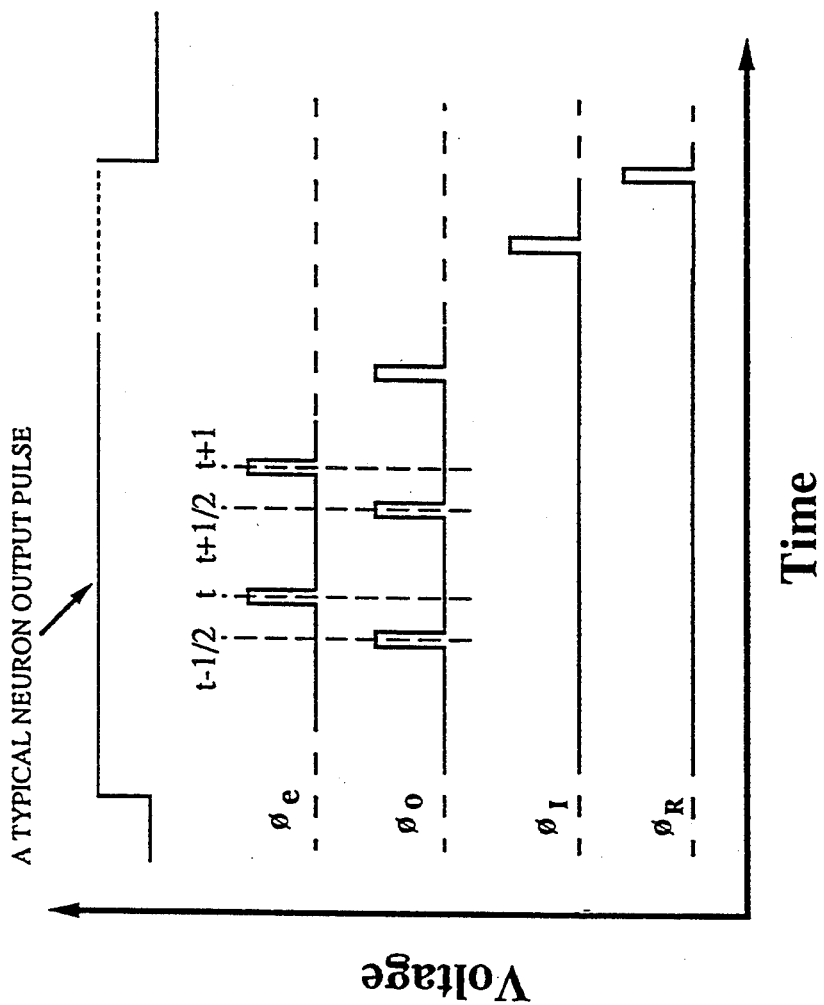
FIGS. 2 is a timing diagram showing various timing waveforms used in the new switched-capacitor analog-storage artificial neuron circuit in accordance with the present invention previously seen in FIG. 1.

One preferred all-electronic embodiment of an artificial neuron in accordance with the present invention, consisting of a plurality of synapses and a neuron soma connected together, is shown in FIG. 1. The timing diagram for the artificial neuron is shown in FIG. 2.

The general circuit design of the artificial nneuron uses two global non-overlapping clock phases $\phi^\circ$ and $\overline{\phi}^\circ$. Synaptic clock phases $\phi_{ij1}$ and $\phi_{ij2}$ are generated from these global phase signals. $X_j(t)$ is the pulse-width-modulated light output signal of the $j^{th}$ neuron received by synapse ij. During the "ON" state of neuron j, the MOS field-effect transistor M7 (alternatively, this connection can be made by a photodiode—see FIGS. 8c and 8d) connects the capacitor $C_{gate}$ (altrnative, a floating-gate transistor (FG)—see FIGS. 8b and 8d) to node ij. Thus, the capacitor $C_{1ij}$ is periodically switched between $-V_{DD}$ (during $\phi_{ij2}$) and capacitor voltage $V_{Gij}$.

This periodic switching of the synaptic capacitors results in a pumping of either negative or positive charge packets to the common node 1 depending on the sign of the synapse. When the input illumination Xj(t) ceases, the capacitor $C_{gate}$ is disconnected from $C_{1ij}$. Hence, the synapse becomes neutral and does not contribute to the charge injection.

Multiplication of the neuron output and the synaptic strength is thus achieved through the periodical switching of $V_{Gij}$ in the time window defined by $X_j(t)$. The synapse sign is determined by the temporal sequence of the clock signals $\phi_{ij1}$ and $\phi_{ij2}$. Reference J. E. Hanson, J. K. Shelton and D. J. Allstot, *A time-multiplexed switched-capacitor circuit for neural network applications*, Proc ISCAS, pp. 2177–2180, 1989.

In the excitatory synapses $\phi_{ij1}$ is $\phi^\circ$ and $\phi_{ij2}$ is $\overline{\phi}^\circ$ and vice versa in the inhibitory ones. This selectivity can be achieved using a register to store the sign. Thus, synaptic sign programmability can be achieved without halving the available dynamic range or requiring the duplication of $C_{gate}$ (or, alternatively, the floating gate (FG) transistor). Note that this scheme also allows a small valued $C_{1ij}$ to be used, since the synapse does not integrate the incoming neuron signal before fully processing it, but rather, processes it in incremental time steps. The integration process is then left to the neuron soma.

Note that the synapse circuit may be designed to use either the synaptic capacitance or the stored charge on the floating gate (or both) as the synaptic weight. Hence, either $C_{ij}$ or $Q_{ij}$ in equation 16 (following in next section 6) can be used for synaptic adaptation. For instance, by replacing $C_{1ij}$ and the capacitor $C_{gate}$ (alternatively, the analog floating-gate storage device FG—see FIGS. 8b and 8d) with a binary array of capacitors and digital switches respectively, one can form a capacitive multiplying digital-to-analog converter (MDAC) configuration. Reference Y. P. Tsividis, supra. In this manner, accuracy can be traded-in for circuit area and viceversa depending on the requirements of the application.

The dynamic synapse of the circuit of the present invention uses the synaptic charge ($Q_{ij}$) directly as a multiplicand, rather than transforming it to a current change and thereby introducing non-linearity. Due to the high coupling (close to one) between the control gate and the floating-gate, almost the entire input voltage range ($-V_{DD}$ to $+V_{DD}$) is available for linear voltage adaptation.

Figure 3:
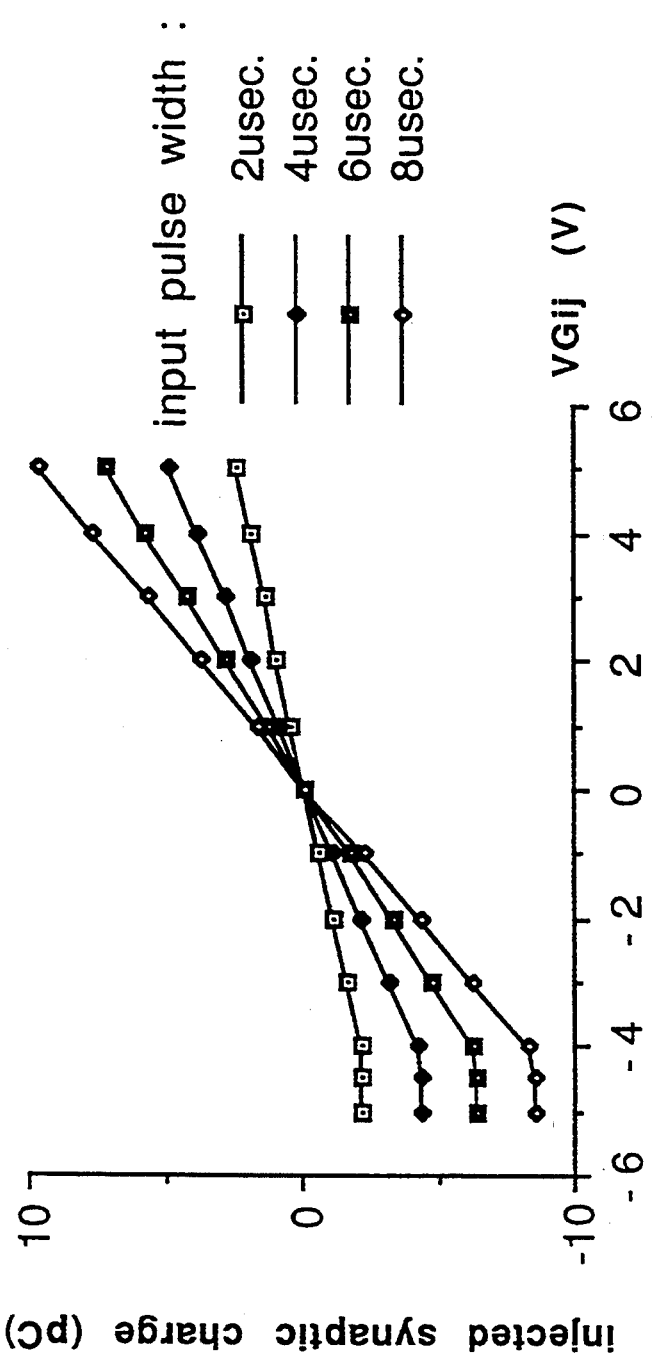
FIG. 3 is a graph showing the total synaptic charge injected to the neuron soma of the new switched-capacitor analog-storage artificial neuron circuit in accordance with the present invention as a function of the stored gate voltage $V_{Gij}$ for different input signal pulse-widths; the graph showing that (i) the synapse charge output is linear with the stored synaptic weight voltage $V_{Gij}$ over the entire available programming range when (ii) the parameters of circuit operation are $C_1=100$ fF and $C_2=43$ fF with a MOSFET gate area=24 $\mu$m$^2$, and a clock frequency=2.5 Mhz.

FIG. 3 shows the characteristic of an artificial synapse in accordance with the present invention. The synapse may be modeled, or simulated, in HSPICE in order to best assess the affect on performance of any change in operational circuits or parameters. In the event of the use of a photodiode as is shown in FIGS. 8c and 8d in lieu of the gating transistor M7, simulation may be performed using the HSPICE radiation model (level 4). Additionally, the first order read-only behavior of a floating-gate transistor (shown in the embodiments of FIGS. 8b and 8d) may be simulated as a MOSFET with a variable threshold voltage. FIG. 2 illustrates a pulse-width modulated neuorm output, and input, signal suitable for use in simulations. Linearity of the artificial synapse with respect to $V_{Tij}$ (or $Q_{ij}$) in almost the entire input voltage range is observed in FIG. 3.

Linearity with respect to the signal inputs follows from the use of the time-domain multiplication method. Simulations with the SPICE program suggest that a 7-bit synapse precision is possible, assuming 5% mismatch in transistor and diode parameters, and 0.1% mismatch in capacitor ratios. The synapse is stray insensitive in both excitatory and inhibitory modes. Due to its capacitive nature, the average power consumption per synapse is as low as 1.25 μW W at 1 MHz ($C_{ij}$=100 fF). The estimated total synapse area is 6000 μm² in a typical 1.2-μ CMOS process. Thus, a synapse density greater than 15000/cm² is possible using the charge accumulation and integration technique of the present invention.

6. Summary Description of the Pulse-Width-Modulating Neuron Soma of the Artificial Neuron of the Present Invention The circuit of the neuron soma shown in FIG. 1 consists of a summing integrator, a voltage-to-pulse-width converter, and a light transmitter. The injected excitatory and inhibitory charges from the synapses are spatially summed at node 1 and temporally integrated at the neuron body. As shown in the following section as equations (18) and (19), the integrator output voltage at the end of the integration period can be expressed as:

$$V_{Ai} = f\left( \sum_{t=1}^{T} \left( \sum_{j=1}^{N} w_{ij}X_j(t) \right) - V_{\theta i} \right) \quad (1)$$

where the synaptic strength $w_{ij}$ is given by:

$$w_{ij} = \frac{C_{ij}}{C_i}\left[ 2V_{DD} + \frac{2Q_{ij}}{C_{pp}} - V_{Ti} + V_{Diode} \right](S_{ij} - S_{ij}) \quad (2)$$

Replacing $C_i$ with a programmable array of capacitors allows the gain of the sigmoid to be controlled. This can be used for hardware annealing. Reference B. W. Lee, supra.

At the end of the integration, $V_{Ai}$—representing the output activity of neuron i—is transferred to node 2 for conversion to a pulse of a duration, or width, in proportion to the magnitude of $V_{Ai}$. At node 2 a high resistance transistor ($M_D$) discharges the capacitor $C_D$ from $V_{Ai}$ to below the threshold voltage $V_{Th}$ of the first (NMOS) invertor. The larger the $V_{Ai}$, the longer the discharge time, and the wider the output pulse $X_i(t)$ will be. Reference A. F. Murray, supra. A low-valued $V_L$ ensures the saturation of $M_D$ throughout the entire discharge period allowing a linear voltage-to-PW conversion. Since the load is capacitive, the operational amplifier of the integrator reduces to two stages (input and gain) using CMOS technology. Reference P. E. Allen and E. Sanchez-Sinencio in SWITCHED CAPACITOR CIRCUITS, Chapter 8, Van Nostrand Reinhold (1984).

Figure 6:
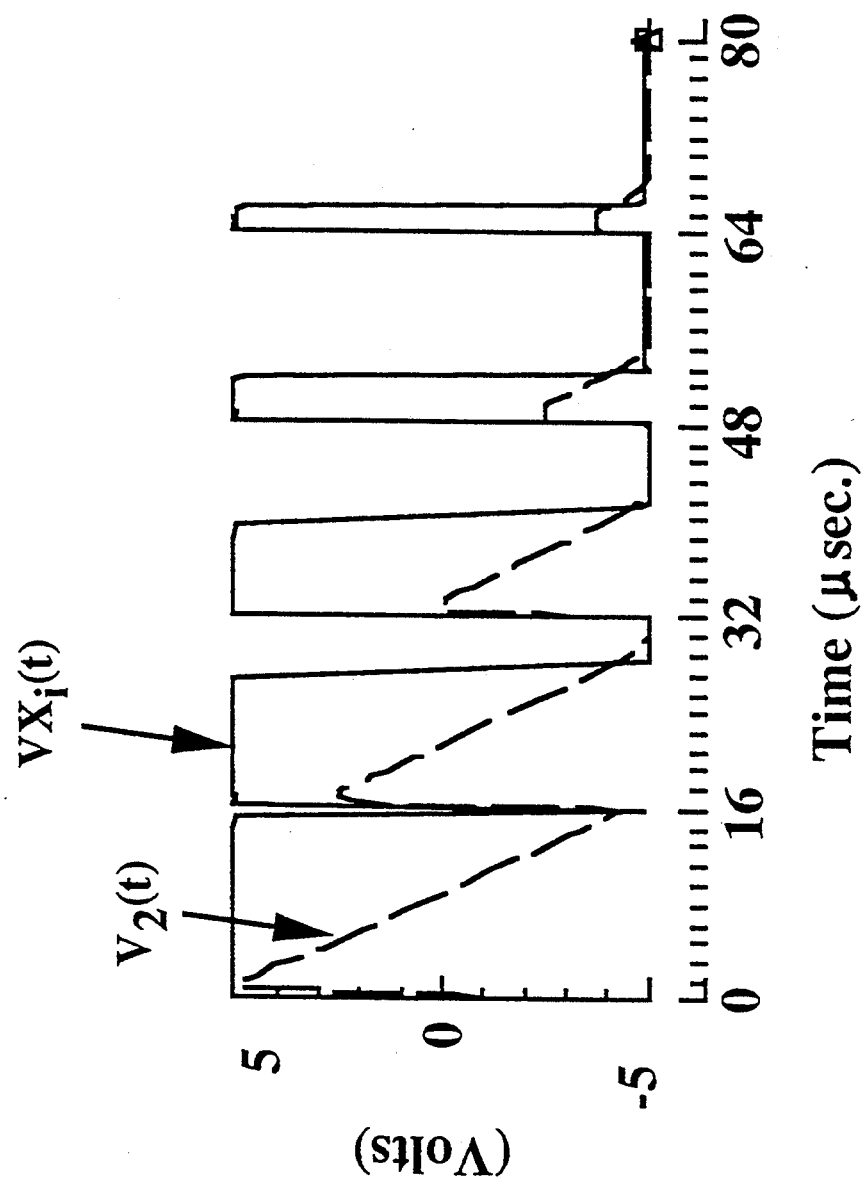
FIG. 6 is a graph showing the output pulses $VX_i(t)$ for that embodiment of the simulated synapse circuit in accordance with the present invention previously seen in FIG. 1 as a function of different non-linear amplifier output voltages $V'_{Ai}$, where $V'_{Ai}$ is the initial value of the voltage signal at node 2 (dotted) in each integration period; the graph generally showing that the larger the $V'_{Ai}$ the wider the output pulse, where the parameters of circuit operation are $C_D=1$pF, $(L/W)_{MD}=15$, and $V_D=-3.5V$.
Figure 7:
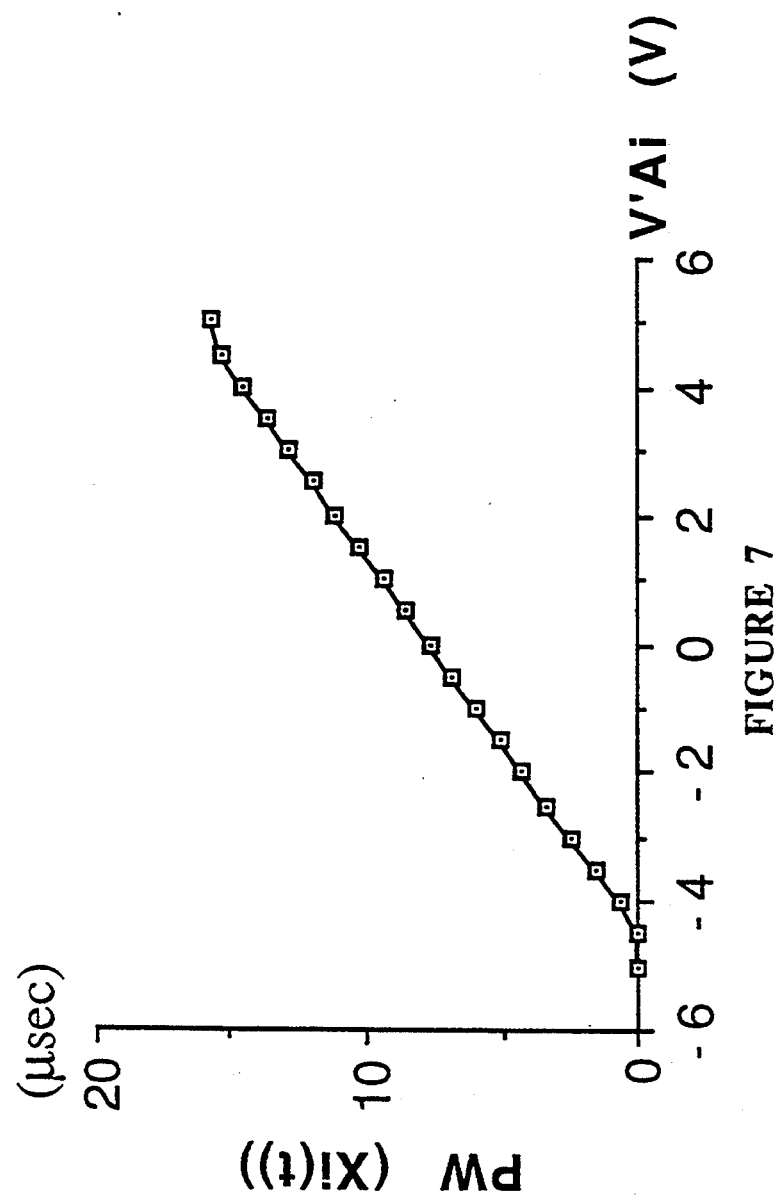
FIG. 7 is a graph showing the width of the neural output pulses as a function of the non-linear amplifier output voltage $V'_{Ai}$ for that embodiment of the artificial neuron circuit in accordance with the present invention previously seen in FIG. 1; the graph generally showing that a high linearity is obtained in the voltage to pulse-width conversion where a parameter of circuit operation is $V_D=-3.5V$.

FIG. 3 shows the behavior of the artificial neuron in accordance with the present invention simulated in HSPICE. The neuron transmitter consists of a modulator capacitance together with its driving circuitry. FIG. 5 illustrates the neuron integration for the case of an excitatory and an inhibitory input. Neural activity first increases as a result of the stronger excitatory input and then begins to decrease due to the drop in the excitatory input. FIG. 6 shows the neural output pulses for different non-linear amplifier output voltages $V_{Ai}$ values: larger $V_{Ai}$ values result in wider neuron output pulses. The integration period can be adjusted depending on neuron output precision required and the available clock frequency. The voltage-to-pulse width (voltage-to-PW) conversion characteristic of the circuit is shown in FIG. 7. Depending on the application, the integrator can be operated in its linear region and the neuron non-linearity can be introduced during the PW conversion. In this manner, the range of the neuron integration linearity can be enhanced.

6. Detail, Mathematically-Based, Description of the Artificial Neuron of the Present Invention In this section and its subsections the design of a fully capacitive synapse circuit using analog storage in accordance with the present invention is analyzed and described rigorously, by use of mathematics.

The circuit of the present invention uses the time-domain multiplication method briefly described above: the amplitude of the variable pulse-width presynaptic inputs is modulated by the synaptic weights to generate the synaptic outputs, which are then spatially and temporally integrated at the neuron soma. This way some complexity is shifted from the synapses to the neuron body, which is of critical importance since generally each neuron has a large number of synapses.

A possible disadvantage of the circuit of the present invention might have been a slowed operation due to the time domain encoding of the neural outputs. However, analog neuron outputs are generally needed only during learning at which time(s) the speed of the artificial neuron, and of the neural network of which it forms a part, is mainly limited by the weight update procedure rather than the feed-forward operation. Once the learning period is completed, the feed-forward operation can be speeded-up by increasing the gain of the neurons to give digital outputs (zero and minimum pulse width).

The use of (i) time-domain multiplication together with (ii) the analog storage of synaptic weights in the circuit of the present invention results in a simple, 2-quadrant synaptic multiplier circuit which typically occupies a small area of 45λ*42λ. The design achieves perfect linearity with respect to the presynaptic inputs and provides almost rail-to-rail linear dynamic range for weight adaptation. The only power consumption is both (i) dyna/nic and (ii) negligible.

In the immediate next subsection 6.1 the new synapse and neuron soma circuits are mathematically analyzed and described. Subsection 6.2 is devoted to the results of the simulation of the circuit, and a discussions of these results. Finally, some concluding remarks are presented in Subsection 6.3.

6.1 Detail Description and Analysis of the Artificial Neuron Circuit

The widely used feed-forward neuron transfer function is given by:

$$X_i = f\left( \sum_{j=1}^{N} w_{ij}X_j - \theta_i \right) \quad (3)$$

where:
$X_i$ is the output activity of neuron i,
$X_j$ is the output activity of a typical presynaptic neuron j,
$w_{ij}$ is the synaptic connection weight from presynaptic neuron j to postsynaptic neuron i,
$\theta_i$ is the threshold of neuron i,
N is the number of neurons connected to neuron i, and
f(●) is a non-linear activation function, generally the sigmoid function.

As per the previous discussion, a pulse-width modulation (PWM) scheme is preferable to encode the neuron output information for analog optoelectronic implementation of learning neural networks. Now, $X_j(t)$ is a time-dependent binary parameter equalling "0" or "1":

$$X_j(t) = (0) \vee (1) \quad (4)$$

where V is the logical OR function. In this case, the neuron transfer function given by equation (3) can be rewritten as:

$$X_i = f\left( \sum_{t=1}^{T} \sum_{j=1}^{N} w_{ij}X_j(t) - \theta_i \right) \quad (5)$$

A second summation (over time) is now needed in order to decode the time-domain information of the presynaptic inputs.

FIG. 1a shows one, all electronic, preferred embodiment of the new synapse and soma circuits. $VX_j(t)$ is the pulse-width modulated output signal of neuron j received by synapse ij. The gate voltage $V_{Gij}$ of the MOSFET M6 is dynamically stored on the gate capacitor $C_{Gate}$ and determines the synaptic weight. Alternatively, a floating-gate device could be used instead of the MOS transistor and the storage capacitor in order to achieve non-volatile storage of the weight. The proper choice of the storage method will depend on the particular technology, learning dynamics and network size. In the following subsections, an analysis of the synapse circuit for the case of DRAM style storage is given. Analysis using a floating-gate device for storage is similar. Reference Krishnamoorthy, et al. supra.

6.1.1. Analysis of the Neuron Synapse

In this subsection, the necessary expressions for the synaptic capacitor voltages $V_{Sij}$ and $V_{j2}$ as a function of non-overlapping clock phases $\phi_o$ and $\phi_e$ and the presynaptic input activity $X_j(t)$ are developed.

First assume that the presynaptic activity is "ON" and obtain $V_{Sij}$ and $V_{j2}$ as a function of different clock phases. When the presynaptic activity is "ON" then $X_j(t)=1$ while $VX_j(t)=V_{DD}$.

During the phase period when $\phi_o=V_{DD}$ while $\phi_e=-V_{DD}$ the transistors M2,M3,M5 are "ON", the transistors M1,M4 are "OFF", and the horizontal clock line voltages $V_{j1}$ and $V_{j2}$ are given as:

$$V_{j1}(\phi_o)=V_{DD} \qquad (6a)$$

$$V_{j2}(\phi_o)=-V_{DD} \qquad (6b)$$

Note that $V_{j1}$ is the drain voltage of the transistor M6 and is at the positive supply level $V_{DD}$. Therefore, neglecting the subthreshold conduction, the source terminal of this transistor will be charged up to:

$$V_{Sij}(\phi_o)=V_{Gij}-V_T \qquad (6c)$$

where $V_T$ is the threshold voltage of the transistor and $V_{Gij}$ is its stored gate voltage.

During the phase period when $\phi_e=V_{DD}$ while $\phi_o=-V_{DD}$, the transistors M1,M4 and M5 are "ON" whereas the transistors M2 and M5 are "OFF". This reverses the sign of the clock line voltages with respect to the previous phase period, that is:

$$V_{j1}(\phi_e)=-V_{DD} \qquad (7a)$$

$$V_{j2}(\phi_e)=V_{DD} \qquad (7b)$$

Note that $V_{j1}$, which is at the negative supply level $-V_{DD}$, is now the source voltage of the transistor M6. Therefore, if the minimum value of the gate voltage $V_{Gij}$ satisfies:

$$V_{Gijmin} \geq -V_{DD}+T \qquad (7c)$$

then the transistor M6 will be "ON" and will discharge its drain terminal to $-V_{DD}$. That is:

$$V_{Sij}(\phi_e)=-V_{DD} \qquad (7d)$$

When the presynaptic activity is "OFF" then $X_j(t)=0$ while $VX_j(t)=-V_{DD}$.

Since the transistor M5 is "OFF", the horizontal clock lines are disconnected from the negative supply level $-V_{DD}$. Therefore, independent of the-clock phases, $V_{j1}$ and $V_{j2}$ will stay at the positive supply level. That is: $V_{j1}=V_{j2}=V_{DD}$. The source voltage of transistor M6 will then be given as:

$$V_{Sij} \approx V_{Gij}-V_T \qquad (8)$$

The maximum value of the programming voltage $V_{Gij}$ is limited by the positive supply level $V_{DD}$, whereas its minimum value is given by the equation (7c). Thus the programming range for can be expressed as:

$$-V_{DD}+V_T \leq V_{Gij} \leq V_{DD} \qquad (9)$$

To satisfy this programming range, the select transistor M7 is chosen to be PMOS. Combining equations (6), (7a) (7d) and (8) gives the necessary expressions for the synaptic capacitor voltages $V_{Sij}$ and $V_{j2}$ as a function of the clock phases and the presynaptic input activity:

$$V_{Sij}(\phi_o) \approx V_{Gij}-V_T \qquad (10a)$$

$$V_{Sij}(\phi_e) \approx -X_j V_{DD}+\overline{X}_j(V_{Gij}-V_T) \qquad (10b)$$

$$V_{j2}(100_o)=V_{DD}(\overline{X}_j-X_j) \qquad (10c)$$

$$V_{j2}(\phi_e)=V_{DD} \qquad (10d)$$

Thus equations (10a–10d) relating the synaptic voltages to the presynaptic input for different clock phases are obtained. These relations will next be used in the following subsection in order to describe the overall operation of the circuit of the artificial neuron in accordance with the present invention.

6.1.2. Analysis of the Neuron Soma

The charge conservation principle is used to analyze the neuron soma. The total charge on the neuron (which is simply the sum of the synaptic charges and the charge of the neuron soma) at the end of the phase period $\phi_o$ can be expressed as:

$$Q(\phi_o) = \sum_{j=1}^{N+1} (C_1 V_{Sij}(\phi_o) + C_2 V_{j2}(\phi_o)) + V_o\left(t-\tfrac{1}{2}\right)C_i \qquad (11)$$

where $V_o(t)$ is the OPAMP output voltage signal, $C_i$ is the integration capacitor and t is the discrete time counter (refer to FIG. 2). Similarly, the total neuron charge at the end of the phase period $\phi_e$ is given by:

$$Q(\phi_e) = \sum_{j=1}^{N+1} (C_1 V_{Sij}(\phi_e) + C_2 V_{j2}(\phi_e)) + V_o\left(t-\tfrac{1}{2}\right)C_i \qquad (12)$$

On the other hand, ignoring the second order effects such as junction leakage, charge pumping, etc., the charge conservation law applies. That is: $Q(\phi_o)=Q(\phi_e)$. Equating equation (9) to equation (10), solving for $V_o(t+\tfrac{1}{2})$, and using equations (10) for $V_{Sij}$ and $V_{j2}$ thus yields:

$$V_o\left(t+\frac{1}{2}\right) = V_o\left(t-\frac{1}{2}\right) + \quad (13)$$

$$\frac{1}{C_i} \sum_{j=1}^{N+1} [C_1(V_{Gij} + V_{DD} - V_T) - 2C_2 V_{DD}] X_j(t)$$

Considering the programming range of $V_{Gij}$ given by equation (7), we can choose:

$$\frac{C_1}{C_2} = \frac{2V_{DD}}{V_{DD} - \frac{V_T}{2}} \quad (14)$$

in order to achieve symmetrical bipolar synaptic weights. Using the relationship of equation (14) in equation (13) gives for the OPAMP output voltage $V_o$ at the time step $t+\frac{1}{2}$:

$$V_o\left(t+\frac{1}{2}\right) = V_o\left(t-\frac{1}{2}\right) + \sum_{j=1}^{N+1} w_{ij} X_j(t) \quad (15)$$

where the synaptic weight $w_{ij}$ is defined as:

$$w_{ij} = 2\frac{C_2}{C_i} V_{DD} \left( \frac{V_{Gij} - \frac{V_T}{2}}{V_{DD} - \frac{V_T}{2}} \right) \quad (16)$$

Equation (15) represents a summation over time. Thus the final value of $V_o$ can be expressed as:

$$V_o\left(T+\frac{1}{2}\right) = V_{Ai} = \sum_{t=1}^{T} \sum_{j=1}^{N} w_{ij} X_j(t) - V_{\theta i} \quad (17)$$

Here it is assumed that the capacitor $C_i$ is sufficiently large such that the integrator never saturates. In equation (17), $V_{Ai}$ represents the net input activity to neuron i and $V_{\phi i}$ is the neuron threshold defined by:

$$V_{\theta i} = -\sum_{t=1}^{T} w_{iN+1} X_{N+1}(t) \quad (18)$$

Here, T is a design parameter defining the length of the integration period which, in turn, depends on the neuron output dynamic range requirements.

At the end of the integration period, the final OPAMP output voltage $V_{Ai}$ is input to a variable-gain amplifier through which the neuron non-linearity is applied. The non-linear amplifier output voltage $V'_{Ai}$ can therefore be expressed as:

$$V'_{Ai} = f(V_{Ai}) = f\left( \sum_{t=1}^{T} \sum_{j=1}^{N} w_{ij} X_j(t) - V_{\theta i} \right) \quad (19)$$

where, in this equation (19), the function $f(\bullet)$ represents the non-linear transfer function of the amplifier. The output activity $V'_{Ai}$ is then transferred to node 2 (via the activation of $\phi_I$) for conversion to a pulse-width signal.

A reset signal $\phi_R$ starts the next integration cycle. At node 2, the transistor $M_D$ discharges the capacitor $C_D$ from $V'_{Ai}$ to below the threshold voltage of the first invertor. Therefore, the larger the $V'_{Ai}$ the longer the discharge time and the larger the neural output pulses. Reference A. F. Murray, *Pulse Arithmetic in VLSI Neural Networks*, IEEE Micro, pp. 64–74, December, 1989. A low-valued gate voltage ($V_D$) of the transistor $M_D$ ensures the saturation of this transistor throughout the entire discharge period, permitting a linear voltage-to-pulse-width conversion characteristic.

7. Results of Simulations of the Circuit, and Discussion of Its Properties

FIG. 3 shows the characteristics of a synapse circuit in accordance with the present invention simulated in HSPICE. The vertical axis represents the total charge injected from synapse ij to neuron body i. As may be seen in the Figure, the synapse output varies linearly with the programming voltage $V_{Gij}$ in the entire available voltage writing range ($-V_{DD}+V_T$, $V_{DD}$).

Synapse linearity with respect to the presynaptic inputs follows from the use of a time-domain multiplication method. Common clocking of the synaptic rows minimizes the clock feed-through error. The synapse circuit is also parasitic insensitive in both excitatory and inhibitory synaptic modes.

Figure 4:
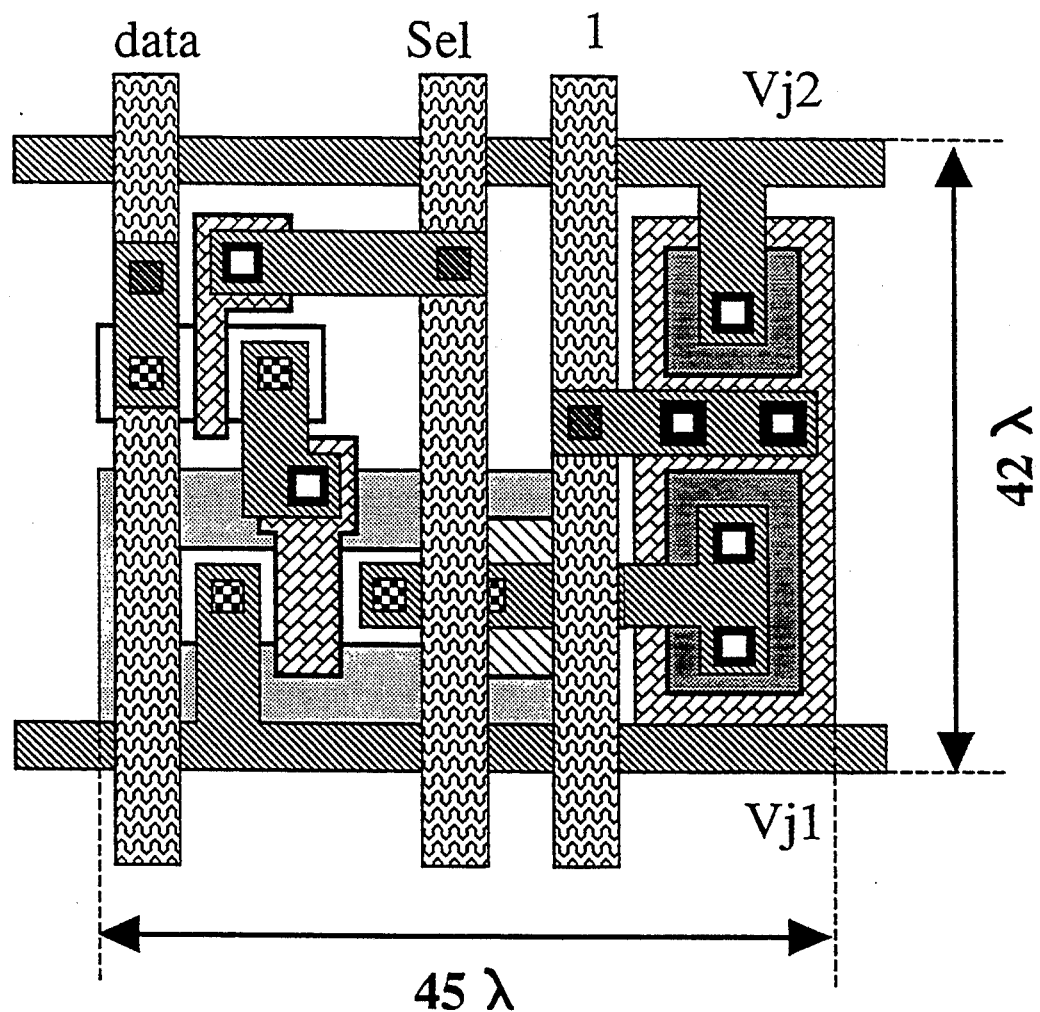
FIG. 4 is a plan view of an exemplary layout in silicon of that embodiment of the artificial neuron circuit in accordance with the present invention previously seen in FIG. 1, which embodiment uses (i) a conventional 2 $\mu$m double-poly, double-metal CMOS technology with (ii) the artificial synapse portion of the circuit occupying a nominal area of 1900 $\mu$m$^2$.
Figure 4:
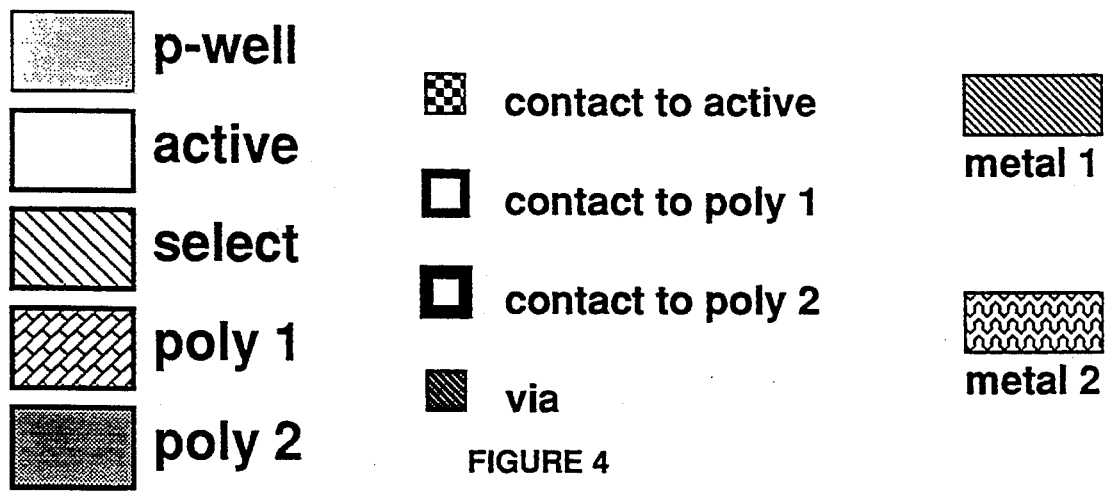

An exemplary layout of the synapse circuit in accordance with the present invention is shown in FIG. 4. The synapse circuit occupies a compact area of $1900\lambda^2$, including the programming switches and the surrounding wiring. Therefore, the circuit of the present invention permits a synapse implementation density of more than $50,000/cm^2$ in a typical 2 $\mu m$ CMOS process. Due to its capacitive nature, the synapse consumes only dynamic power: the average power consumption per synapse is less than 2 $\mu W$ at 1 MHz. SPICE simulations show that 7-bit synapse precision is possible considering typical process variations.

Figure 5A:
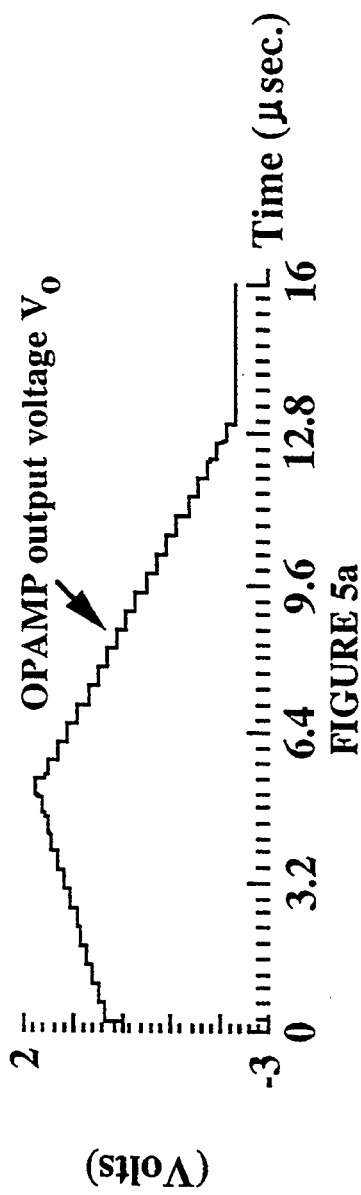
FIGS. 5a, 5b, and 5c, are graphs of the OPAMP output voltage $V_o$ for the case of one excitatory and one inhibitory input ($V_{Gij}=-2V$, $V_{Gik}=4V$) to two synapses of that embodiment of the artificial neuron circuit in accordance with the present invention previously seen in FIG. 1; the graphs showing that neural activity first increases as a result of the stronger excitatory input and then begins to decrease due to the drop in the excitatory input, where (i) the signal OPAMP is equivalent to a voltage-controlled voltage-source, and (ii) the parameters of circuit operation are OPAMP gain=10,000 and $C_i=1.5$pF with all switches being of minimum geometry.
Figure 5B:
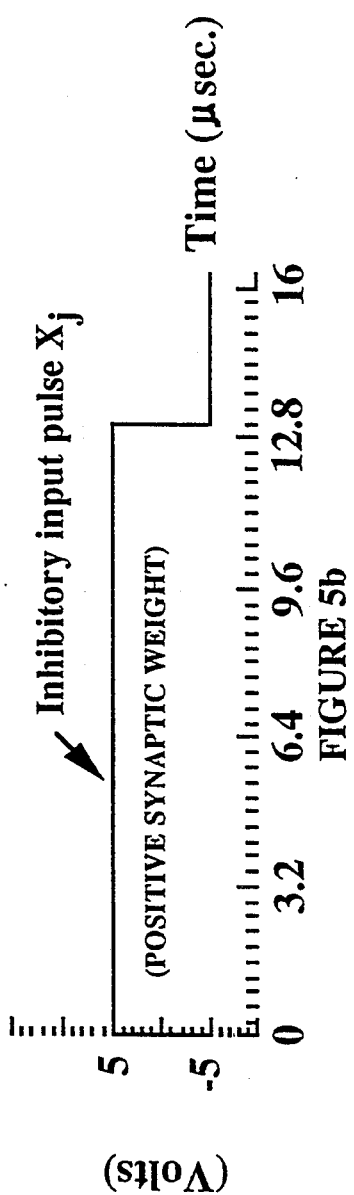
Figure 5C:
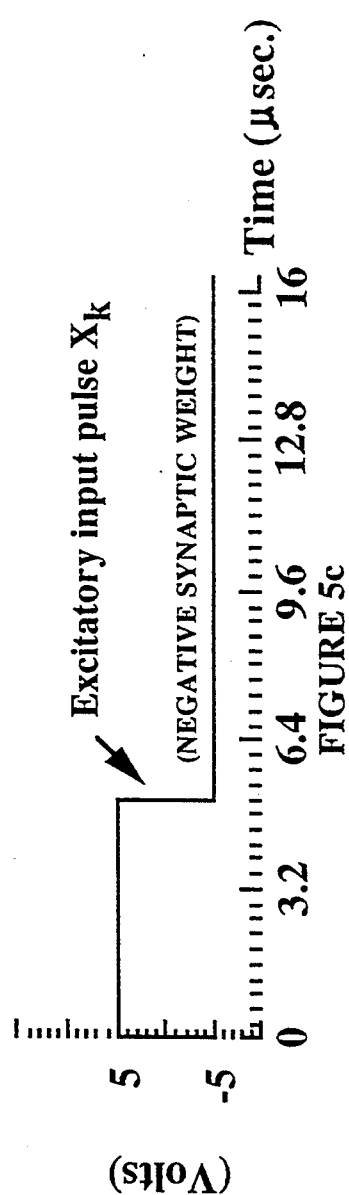

FIG. 5, consisting of FIG. 5a through FIG. 5c, illustrates the typical behavior of an artificial neuron in accordance with the present invention in the event of one excitatory and one inhibitory synapse. Neural activity first increases as a result of the stronger excitatory input. It then begins to decrease due to the drop in the excitatory input. Depending on the neuron precision requirements, the OPAMP can be replaced with a simple invertor to permit faster integration with narrower pulse widths.

FIG. 6 shows example neural output pulses as a function of different input activities. Larger non-linear amplifier output voltages (corresponding to higher output activities) result in wider output pulses.

Finally, in FIG. 7, an exemplary voltage-to-pulse-width conversion characteristic for an artificial neuron in accordance with the present invention is shown. A high linearity of conversion is clearly observed.

The artificial neuron in accordance with the present invention is eminently suitable for use in, and with, numerous neural network, or processors, constructed in accordance with diverse architectures. A schematic diagram of a portion of that same artificial neuron circuit in accordance with the present invention having (i) an electrical input and (ii) DRAM-style storage of synaptic weight as was previously seen in FIG. 1 is shown in FIG. 8a. Similarly, a schematic diagram of a portion of an artificial neuron circuit in accordance with the present invention having (i) an electrical input and (ii) floating-gate storage of synaptic weight, which portion corresponds to that portion seen in FIG. 8a, is shown in FIG. 8b. Further similarly, FIG. 8c shows the corresponding portion of an artificial neuron circuit in accordance with the present invention having (i) a electrical input and (ii) DRAM-style storage of synaptic weight, and FIG. 8d shows the corresponding portion of an artificial neuron circuit in accordance with the present invention having (i) an optical input and (ii) floating-gate storage of synaptic weight, which portion corresponds to that portion previously seen in FIG. 8a.

8. Use of an Embodiment of the Artificial Neuron in an Optoelectronic Processor Those particular optoelectronic embodiments on an artificial neuron in accordance with the present invention shown in FIGS. 8c and 8d are eminently suitable for use in a network architecture in accordance with the teachings of companion U.S. patent application Ser. No. 07/846,277 filed on Mar. 2, 1992, for a DUAL-SCALE TOPOLOGY OPTOELECTRONIC MATRIX ALGEBRAIC PROCESSING SYSTEM to the selfsame Ashok V. Krishnamoorthy and Sadik C. Esener who are co-inventors of the present application, and also to Gary C. Marsden and Joseph E. Ford. The contents of the related application are incorporated herein by reference. In the D-STOP architecture taught within the companion patent application an artificial neuron in accordance with the present invention may serve as the basic Optoelectronic Processor Element (OPE) building block of an Optoelectronic Processor (OP).

Figure 9:
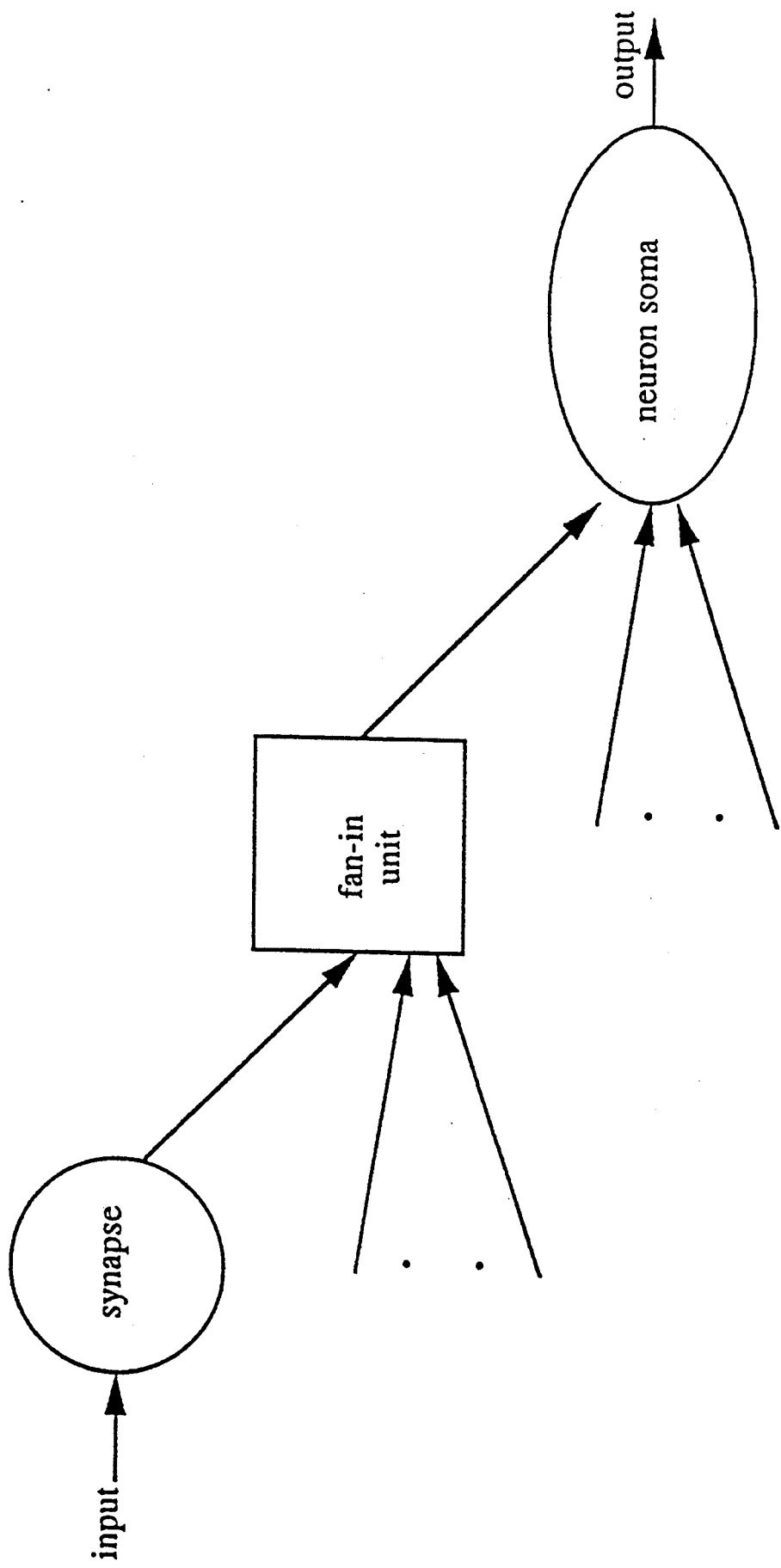
FIG. 9 is a functional diagram showing one use of an artificial neuron in accordance with the present invention within a neural network, or a processor, system, the use being in conjunction with one or more fan-in units located between the neuron synapses and the neuron soma.

FIG. 9 is a functional diagram showing the use of an artificial neuron in accordance with the present invention within a neural network, or a processor, system. The illustrated use is in conjunction with one or more fan-in units located between the neuron synapses and the neuron soma. The fan-in units permit subtraction of inhibitory synapse outputs from excitory synapse outputs, easing the range requirements of a next subsequent synapse receiving both signals. The fan-in units permit attenuation, or amplification, of the synaptic output signals received in order to control the neuron gain, speed, etc. during different modes of network operation, such as during learning, post-learning, etc. Finally, the fan-in units permit multiplication of a received neuron output signal by a non-linear function, or (equivalently) a "weighting" of the signal. in order to introduce sub-field effects such as variably sized inputs, subfield searches, etc.

Figure 10:
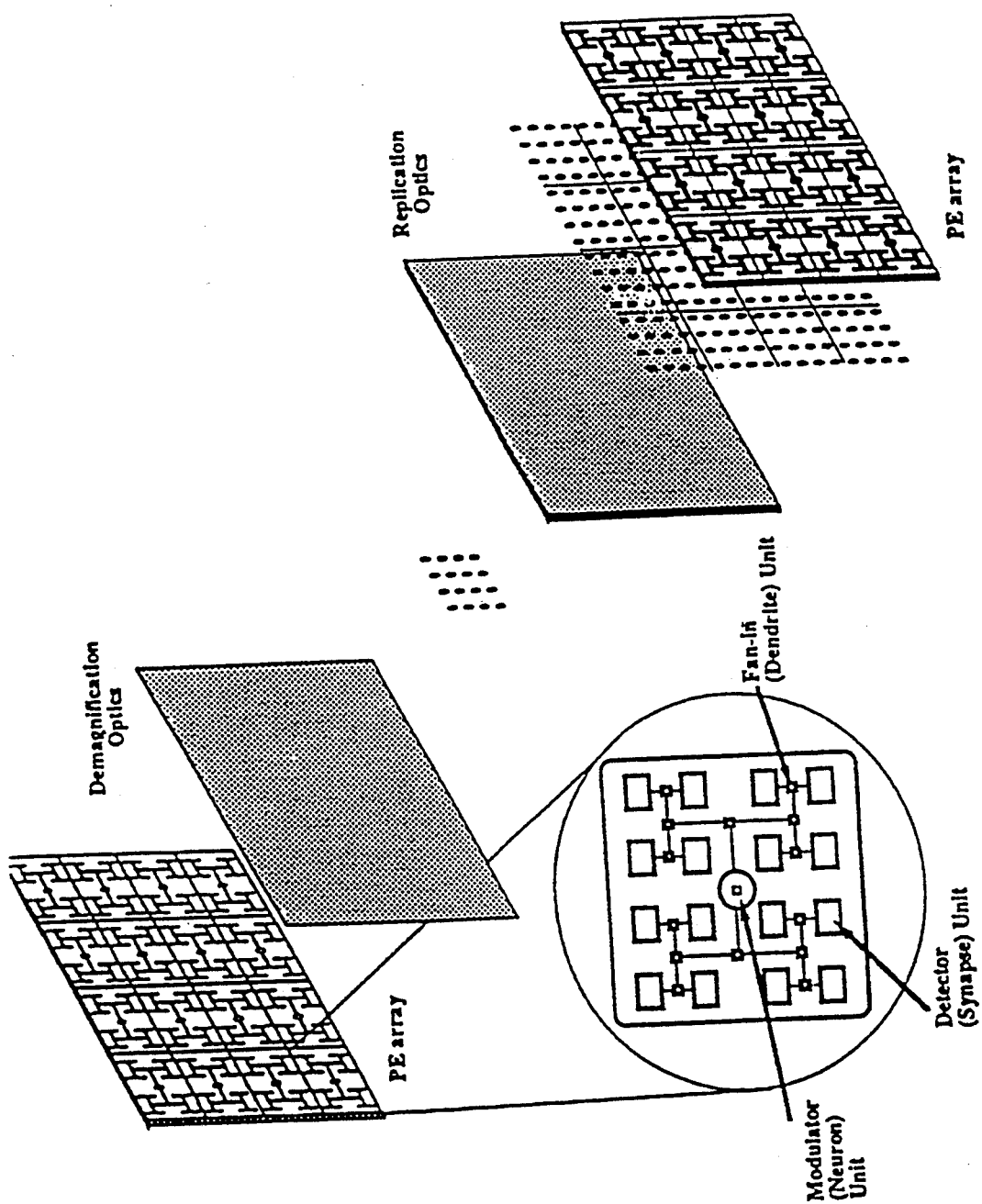
FIG. 10 is a schematic of a complete architecture of an optoelectronic matrix algebraic processing system using the optoelectronic embodiment of an artificial neuron circuit in accordance with the present invention previously seen in FIGS. 8c and 8d, the system particularly using the artificial neuron circuit as an optoelectronic processing element (OPE) including detectors (synapse) units, modulator (neuron) units, and fan-in (dendrite) units.
Figure 11B:
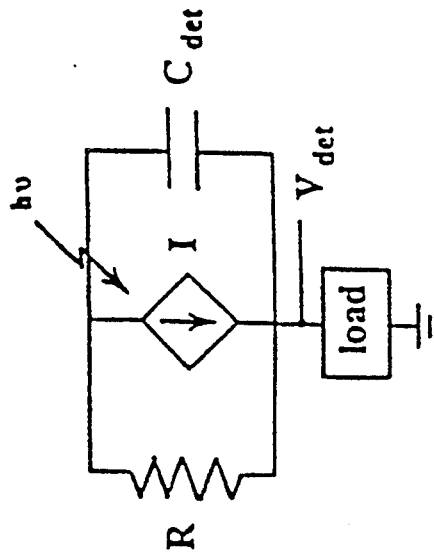
FIG. 11b is a schematic diagram of the equivalent circuit of a light detector.
Figure 11D:
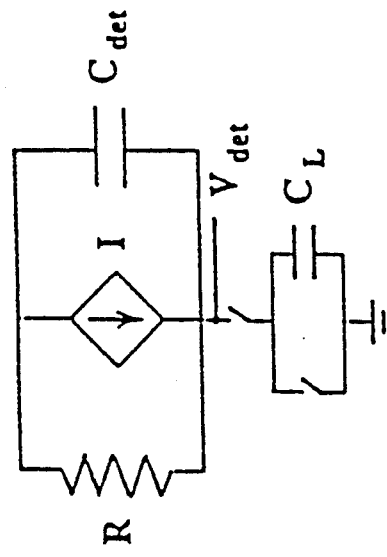
FIG. 11d is a schematic diagram of the equivalent circuit of a binary light detector with a capacitive load.
Figure 11A:
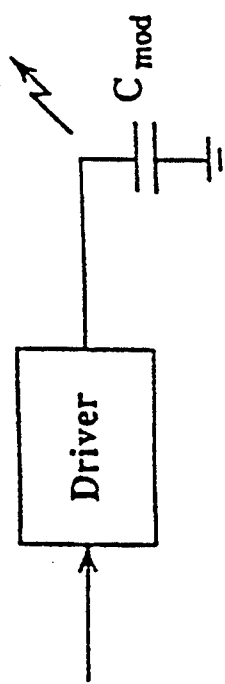
FIG. 11a is a schematic diagram of the equivalent circuit of a light modulator.
Figure 11C:
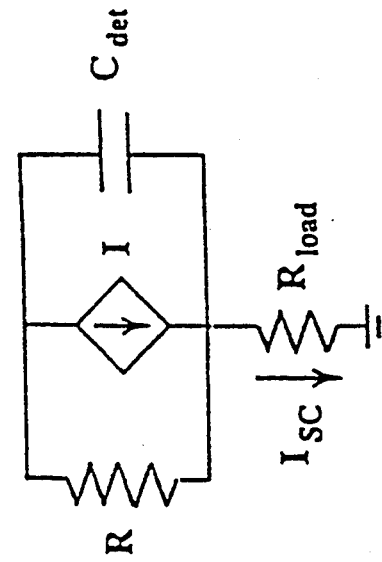
FIG. 11c is a schematic diagram of the equivalent circuit an analog light detector with a resistive load.

FIG. 10 is a schematic of a complete architecture of an optoelectronic matrix algebraic processing system using that optoelectronic embodiment of an artificial neuron circuit in accordance with the present invention previously seen in FIGS. 8c and 8d. The illustrated system particularly uses the artificial neuron circuit as an optoelectronic processing element (OPE) including detectors (synapse) units, modulator (neuron) units, and fan-in (dendrite) units. The system involves an optical distribution from an Optoelectronic Processor 1 (OP1) to an Optoelectronic Processor 2 (OP2). FIG. 10 incorporates, in exploded view, the representation of an exemplary OP1,2. Each OP1,2 is of a nominal 16×16 array size. An exploded view of a single OPE shows the concept, that, for neural network applications of the circuit of the present invention, particularly including its application in the D-STOP architecture, a leaf unit may be called a "synapse", a fanning unit may be called a "dendrite", and a root unit may be called a "neuron".

9. Variations and Adaptations

The present invention has demonstrated that the low power consumption, high resistance and high linear dynamic range properties of capacitance-based techniques can suitably be combined with area efficient (i) analog storage and/or (ii) time-domain multiplication methods. The preferred fully capacitive synapse design of the artificial neuron circuit in accordance with the present invention is particularly well suited to large scale parallel implementations of adaptive neural networks.

However, still other circuits, and designs, in accordance with the present invention are possible. For example, the synaptic weight need not be stored as the charge upon a capacitor, nor even as an analog quantity, but could, instead, be stored as a digital quantity which was converted by an Analog-to-Digital (A/D) converter to an analog quantity if, and when required.

In accordance with these and still other variations and adaptations of the present invention, the scope of the invention should be determined by the following claims, only, and not solely in accordance with those particular embodiments within which the invention has been taught.

What is claimed is:

1. An artificial neural network circuit comprising:
  a plurality of synapse means, each
    for receiving an associated pulse-width-modulated, PWM, input signal from another, preceding, neural circuit, and
    for producing as the product of (i) the received PWM input signal and (ii) a stored synaptic weight a time- and amplitude-modulated synaptic signal;
  a synapses-to-neuron soma channel means for transmitting the time- and amplitude-modulated signals produced by the plurality of synapse means to a neuron soma means;
  a neuron soma means
    for receiving a plurality of time- and amplitude-modulated synaptic signals from the plurality of synapse means via the synapses-to-neuron soma channel means, and
    for summing and for integrating the received plurality of time- and amplitude-modulated synaptic signals to produce a pulse-width-modulated, PWM, output signal; and
  a neuron soma-to-synapse channel means for communicating the pulse-width-modulated, PWM, output signal from the neuron soma means to a plurality of synapse means of another, succeeding, neural network circuit as the input signals thereof.

2. The artificial neural network circuit according to claim 1 wherein each of the plurality of synapse means comprises:
  an optoelectronic synapse for producing from a pulse-width-modulated, PWM, input signal optically communicated thereto an electrical time- and amplitude-modulated synaptic signal.

3. The artificial neural network circuit according to claim 2 wherein the synapses-to-neuron soma channel means comprises:
  an electrical synapses-to-neuron soma channel for electrically communicating the electrical time- and amplitude-modulated synaptic signals from the plurality of optoelectronic synapses to the neuron soma means.

4. The artificial neural network circuit according to claim 3 wherein the neuron soma means comprises:
   an optoelectronic neuron soma responsive to a plurality of electrical time- and amplitude-modulated synaptic signals for producing an optical pulse-width-modulated, PWM, output signal.

5. The artificial neural network circuit according to claim 4 wherein the neuron soma-to-synapse channel means comprises:
   an optical neuron-to-synapse channel for optically communicating the optical pulse-width-modulated, PWM, output signal from the optoelectronic soma neuron to the plurality of synapse means of a next succeeding neural network circuit.

6. The artificial neural network circuit according to claim 1 wherein each of the plurality of synapse means comprises:
   an electronic synapse for producing from a pulse-width-modulated input signal electrically communicated thereto an electrical time- and amplitude-modulated synaptic signal.

7. The artificial neural network circuit according to claim 6 wherein the synapses-to-neuron soma channel means comprises:
   an electrical synapses-to-neuron soma channel for electrically communicating the electrical time- and amplitude-modulated synaptic signals from the plurality of electronic synapses to the neuron soma means.

8. The artificial neural network circuit according to claim 7 wherein the neuron soma means comprises:
   an electronic neuron soma responsive to an electrical time- and amplitude-modulated synaptic signals for producing an electrical pulse-width-modulated, PWM, output signal.

9. The artificial neural network circuit according to claim 8 wherein the neuron soma-to-synapse channel means comprises:
   an electrical neuron-to-synapse channel for electrically communicating the electrical pulse-width-modulated, PWM, output signal from the electronic soma neuron to the plurality of synapse means of a next succeeding neural network circuit.

10. The artificial neural network circuit according to claim 8 wherein the neuron soma-to-synapse channel means comprises:
    a free-space optical interconnection.

11. The artificial neural network circuit according to claim 1 wherein the synapse-to-neuron channel means comprises:
    an electrically conductive interconnection having an innate capacitance.

12. The artificial neural network circuit according to claim 11 wherein the electrically conductive interconnection comprises:
    an H tree which, because it has innate capacitance is, ergo, an H-shaped capacitor.

13. The artificial neural network circuit according to claim 1 wherein the neuron soma means comprises:
    a summing integrator means for (i) summing and (ii) integrating the collected plurality of time- and amplitude-modulated synaptic signals to produce, over a fixed time duration, an analog voltage result signal;
    a voltage-to-pulse-width converter for converting a final value of the analog voltage result signal into a pulse-width-modulated, PWM, output signal the duration of which encodes the magnitude of the voltage; and
    a switch means for communicating the voltage produced by the summing integrator to the converter at a time after the integration is complete.

14. The artificial neuron according to claim 13 which, between the summing integrator means and the voltage-to-pulse-width converter, further comprises:
    means for inducing a non-linearity in the analog voltage result signal.

15. The artificial neural network circuit according to claim 1 wherein each of the plurality of synapse means comprises:
    an analog means for storing the synaptic weight as an analog quantity;
    a capacitor means for accumulating electrical charge; and
    a charging means, receiving the stored analog synaptic weight, for periodically charging the capacitor means from a source of voltage (i) proportionately to the stored analog synaptic weight and (ii) selectively during the temporal persistence of the pulse-width-modulated signal;
    wherein the periodic charging of the capacitor means produces the time- and amplitude-modulated synaptic signal as the product of duration of the pulse-width-modulated signal times the analog synaptic weight.

16. A method of signal processing in an artificial neuron having a plurality of artificial synapses and an artificial neuron soma, the method comprising:
    storing Synaptic weights at each of the plurality of artificial synapses;
    receiving into the plurality of artificial synapses a plurality of input signals, each input signal being in the time domain, meaning a signal the duration of which encodes information;
    multiplying in the time domain within each of the artificial synapses the stored synaptic weight times the received input signal in order to produce an associated product signal that is in both the time and the amplitude domains, meaning a signal the duration of which encodes the information of the synapse's input signal and the amplitude of which encodes the synapse's synaptic weight;
    summing and integrating in the time and amplitude domains within the artificial neuron soma the product signals of the plurality of artificial synapses in order to produce a result signal that is in the amplitude domain, meaning a signal the amplitude of which encodes information;
    transforming in the artificial neuron soma the result signal to an output signal that is in the time domain; and
    transmitting the output signal;
    wherein the plurality of input signals received, and also the transmitted output signal, are all in the time domain;
    wherein the multiplication occurring within the plurality of artificial synapses is by operation on input signals that are in the time domain to produce product signals that are in both the time and amplitude domains;
    wherein the summation and integration occurring within the artificial neuron soma is by operation on product signals that are in both the time and amplitude domains to produce a result signal that is in the amplitude domain;

wherein the transformation occurring within the artificial neuron soma is by operation on the result signal that is in the amplitude domain to produce an output signal that is in the time domain;

wherein the net total signal processing transpiring within the artificial neuron is on input signals that are in the time domain to produce an output signal that is likewise in the time domain, but the processing has used signals that are in the amplitude domain.

17. The method according to claim 16 wherein the multiplying within each artificial synapse comprises:
periodically switching electrical charge to capacitors for and during the duration of the time domain input signal in proportion to the stored synaptic weight in order to produce the to produce the product signal in the amplitude domain.

* * * * *